(12) United States Patent
Gautam et al.

(10) Patent No.: US 10,657,125 B1
(45) Date of Patent: *May 19, 2020

(54) METHODS AND SYSTEM FOR PROVIDING REAL-TIME BUSINESS INTELLIGENCE USING NATURAL LANGUAGE QUERIES

(71) Applicant: Progress Software Corporation, Bedford, MA (US)

(72) Inventors: Shyamantak Gautam, Bangalore (IN); Ruban Phukan, Bangalore (IN); Sundeep Sanghavi, Fairfax, VA (US); Vishal Katkar, Margao (IN)

(73) Assignee: Progress Software Corporation, Bedford, MA (US)

( * ) Notice: Subject to any disclaimer, the term of this patent is extended or adjusted under 35 U.S.C. 154(b) by 325 days.

This patent is subject to a terminal disclaimer.

(21) Appl. No.: 15/587,751

(22) Filed: May 5, 2017

Related U.S. Application Data

(63) Continuation of application No. 14/304,487, filed on Jun. 13, 2014, now Pat. No. 9,665,662.

(60) Provisional application No. 61/834,608, filed on Jun. 13, 2013.

(51) Int. Cl.
*G06F 16/2452* (2019.01)
*G06F 17/28* (2006.01)
*G06F 40/40* (2020.01)

(52) U.S. Cl.
CPC ........ *G06F 16/24522* (2019.01); *G06F 40/40* (2020.01)

(58) Field of Classification Search
CPC .... G06F 16/903; G06F 16/3328; G06F 17/28; G06F 16/24522
See application file for complete search history.

(56) References Cited

U.S. PATENT DOCUMENTS

| 5,809,499 A | 9/1998 | Wong et al. |
| 6,101,491 A | 8/2000 | Woods |
| 7,395,256 B2 * | 7/2008 | Ji .......................... G06F 16/313 707/737 |

(Continued)

OTHER PUBLICATIONS

Sun et al. "Articulate: A Semi-automated Model for Translating Natural Language Queries into Meaningful Visualizations" [online], Tretrieved from the internet: <URL: http://link.soringer.com/chater/10.1 007%2F978-3-642-13544-6 18#page-I>, dated 2010, 12 pages.

(Continued)

*Primary Examiner* — Grace Park
*Assistant Examiner* — Hubert Cheung
(74) *Attorney, Agent, or Firm* — Patent Law Works LLP

(57) ABSTRACT

The methods and systems for providing real-time business intelligence using national language queries facilitate a user to search within a data warehouse using a natural language question. Such business intelligence platform may receive a natural language based question, extract one or more key words from the natural language based question, determine a first dependency graph of the one or more key words based on a relationship among the one or more key words, determine a second dependency graph of the one or more key words based on previously stored search indices, merge the first and the second dependency graphs to generate an integrated dependency graph, and generate a formatted search string based on the integrated dependency graph.

20 Claims, 20 Drawing Sheets

(56) References Cited

U.S. PATENT DOCUMENTS

| | | |
|---|---|---|
| 7,548,909 B2 | 6/2009 | Rappaport et al. |
| 7,606,805 B2 * | 10/2009 | Harris ................... G06F 16/951 |
| 7,606,835 B2 | 10/2009 | Laaser et al. |
| 7,716,174 B2 | 5/2010 | Lee et al. |
| 7,953,762 B2 | 5/2011 | Sanjay et al. |
| 8,006,197 B1 | 8/2011 | Nevill-Manning et al. |
| 8,370,352 B2 | 2/2013 | Lita et al. |
| 8,370,375 B2 | 2/2013 | Dellinger et al. |
| 8,386,456 B1 | 2/2013 | Paiz |
| 8,396,859 B2 * | 3/2013 | Green ................... G06F 16/951 |
| | | 707/713 |
| 8,606,739 B2 | 12/2013 | Apacible et al. |
| 8,832,091 B1 * | 9/2014 | Bhagat ................ G06F 16/9024 |
| | | 707/723 |
| 9,177,275 B2 * | 11/2015 | Nesamoney ........ G06F 16/2458 |
| 2002/0049747 A1 | 4/2002 | Inohara |
| 2004/0088158 A1 | 5/2004 | Sheu et al. |
| 2005/0149496 A1 | 7/2005 | Mukherjee et al. |
| 2008/0071772 A1 | 3/2008 | Rosenoff et al. |
| 2008/0235199 A1 * | 9/2008 | Li ....................... G06F 16/243 |
| 2008/0250450 A1 * | 10/2008 | Larner ............... G06Q 30/0256 |
| | | 725/34 |
| 2010/0063981 A1 | 3/2010 | Thomsen |
| 2011/0035744 A1 | 2/2011 | Bhatia |
| 2011/0191361 A1 | 8/2011 | Gupta et al. |
| 2011/0246439 A1 | 10/2011 | Isard et al. |
| 2011/0270829 A1 | 11/2011 | Xie et al. |
| 2012/0047164 A1 | 2/2012 | Saadat |
| 2012/0226676 A1 | 9/2012 | Kasterstein et al. |
| 2012/0254143 A1 | 10/2012 | Varma |
| 2013/0013329 A1 | 1/2013 | Brogan et al. |
| 2013/0103677 A1 | 4/2013 | Chakra et al. |
| 2014/0095505 A1 | 4/2014 | Blanchflower |
| 2014/0122455 A1 * | 5/2014 | Leitner ............... G06F 16/2471 |
| | | 707/706 |
| 2014/0365584 A1 * | 12/2014 | Abali ..................... H04L 51/20 |
| | | 709/206 |

OTHER PUBLICATIONS

Wiza, et al. Periscope: a system for adaptive 3D visualization of search results. (2004)29-40.10.1145/985040.985045.

* cited by examiner

US 10,657,125 B1

METHODS AND SYSTEM FOR PROVIDING REAL-TIME BUSINESS INTELLIGENCE USING NATURAL LANGUAGE QUERIES

CROSS REFERENCE TO RELATED APPLICATIONS

This application is a continuation of and claims priority to U.S. application Ser. No. 14/304,487, filed Jun. 13, 2014, titled "Method and System for Providing Real-Time Business Intelligence Using National Language Queries," which claims priority under 35 U.S.C. § 119 to U.S. Provisional Application No. 61/834,608, filed on Jun. 13, 2013, entitled "Methods and System for Providing Real-Time Business Intelligence Using Search Engines Based On Natural Language Queries." U.S. application Ser. No. 14/304,487 is also related to U.S. Non-Provisional application Ser. No. 14/304,490, filed Jun. 13, 2014, entitled "Methods and System for Providing Real-Time Business Intelligence Using Search-Based Analytics Engine," the entireties of which are hereby incorporated by reference.

Applicants hereby notify the USPTO that the claims of the present application are different from those of the aforementioned related application. Therefore, Applicant rescinds any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application or any other related application.

The aforementioned applications are all herein expressly incorporated by reference.

FIELD

Some embodiments described herein generally address apparatuses, methods, and systems for intelligent data discovery and analytics, and more particularly, include methods and system for providing real-time business intelligence using national language queries.

BACKGROUND

Known data analysis and business intelligence systems use data warehouses and/or build Online Analytical Processing (OLAP) cubes for pre-computing business data in search of business intelligence. The data in a data warehouse is generally queried using database development structured programming languages such as Structured Query Language (SQL). A user such as a database administrator inputs a SQL query into the business data warehouse, and in turn receives the query results in a SQL format.

SUMMARY

Some embodiments described herein relate generally to providing real-time data analysis, reporting and business intelligence related to data stored in various sources, and more particularly, to providing real-time business intelligence to users, irrespective of users' technical knowledge, using natural language interfaces.

In some embodiments, methods and system provide a substantially real-time statistical analysis and computation engine developed based on search engine technology to store and access data in index files or on file system or in-memory stores without using data warehouses that store data in databases. The methods and system also provide a natural language and search based interface to analyze data and generate reports without a need for writing SQL or other coding or programming techniques for queries or using software configurations for creating reports.

DETAILED DESCRIPTION

Figure 1:
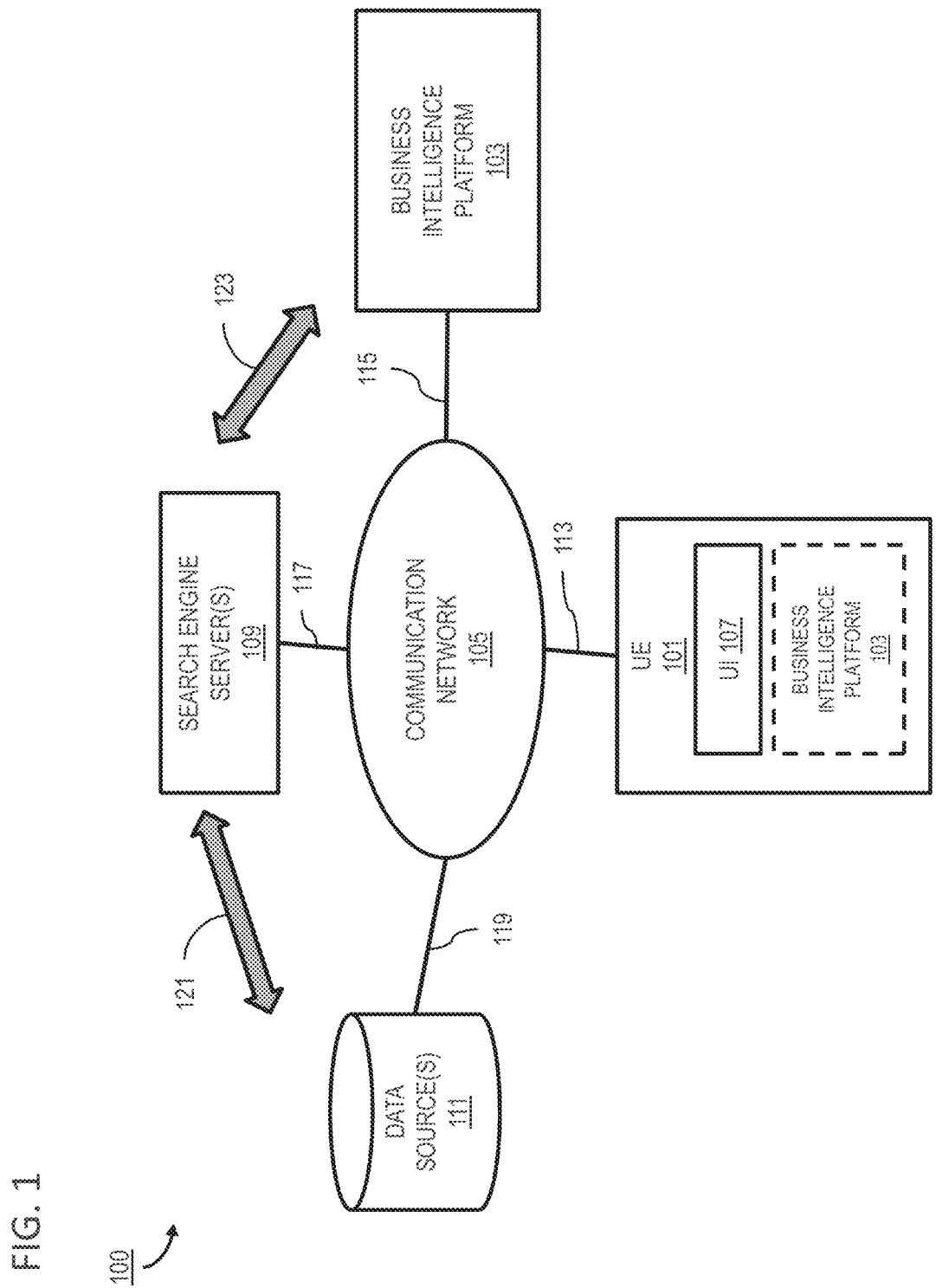
FIG. 1 is a schematic block diagram of a communication network system in which real-time business intelligence functions can be provided, according to an embodiment.

A real-time data discovery and business intelligence platform using natural language queries allows a user to search within a data warehouse or other data sources using a natural language question. For example, a user may input a question in a natural language via a user interface (e.g., see 501 in FIG. 5) by either manually typing the question, or speaking the question via a microphone, and/or the like. A natural language processing module (e.g., see 201 in FIG. 2A) may process the natural-language-based question, and translate the question into a database query in the format of a structured database language, such as SQL, or a search engine query or any other query formats as required by the data source and/or the like. The generated query may be used by a search-engine-controlled module (e.g., see 205 in FIG. 2A) to query a database (e.g., see 303 in FIG. 3) for the desired data. In one implementation, the natural language processing module 201 may extract natural-language-based key words (or key terms, key phrases as used interchangeably throughout the disclosure) from the natural-language-based question, and define an inter-dependency graph between the key words to determine the logic relationship between the key words, so as to translate the natural-language-based key words into a search query, e.g., see FIGS. 2D-2F. It is to be noted that "business intelligence" as recited throughout the specification, broadly includes a variety of data discovery, data analytics, data mining, data prediction/forecasting, statistical modeling, data search, data aggregation, data learning, and/or any visualization, presentation and intelligence from the data. In one implementation, business intelligence may include the scope of analysis in Internet of Things (IoT) and/or Internet of Everything (IoE).

In one embodiment, various natural-languages-to-SQL-query translation may be employed by the business intelligence platform. Example translation technology may include, but not limited to template-based translation techniques, rule- or grammar-based translation techniques and also statistical machine-training approaches like cascaded conditional random fields (CRF), and/or the like.

In one implementation, template-based and rule-/grammar-based approaches cater to a defined set of queries that fall into the purview of a manually-defined set. The machine-based approach of CRF may be able to broaden the scope of the search but still may be effective only when the training set for learning is effectively selected and trained. Also the machine-based approach uses a conditional probabilistic structure which works in the context of applications like database search, web search, text analysis, Geographic Information System (GIS) or Human Resources (HR) application, and/or the like use cases where approximation in labeling of keywords is sufficient. A CRF-based approach, however, may not perform effectively for computational applications such as data discovery and data analytics, which use definite identification of entities, relationships and aggregation functions to deliver accurate results. Further discussion of natural language query with cascaded CRF are discussed in U.S. patent publication no. 2012/0254143, titled "Natural Language Querying with Cascaded Conditional Random Fields," which is herein expressly incorporated by reference.

In one implementation, the business intelligence platform enables data discovery and business intelligence from disparate data sources where the sources themselves may be non-relational in nature, with variable data structures or schema, and may include metadata structural information that is not readily available. These include sources like Hadoop or NoSQL data, log files, machine data, in-memory storage and others. In one implementation, the business intelligence platform analyzes a context of the natural language query based the data obtained from various data sources, and on structural information obtained from the natural language question. The business intelligence platform may then employ a cross functional-dependency graph based approach to accurately map the query context purely based on the data obtained from various sources and develop the aggregation for analysis. In one implementation, an industry knowledge bank with a continuous real-time training can be used to identify common connotations. The business intelligence platform may not require training upfront to apply for different use cases (e.g., different user input natural language questions, etc.) but may learn as users ask more and more questions, and may improve the translation based on user feedback.

In one implementation, the business intelligence platform indexes data from disparate sources into a computation search engine designed for real-time ad-hoc multi-dimensional analysis. The search engine can be used as an underlying data storage mechanism that enables fast multi-dimensional lookups in real-time, which enables real-time processing of a natural language question using cross functional-dependency algorithms without a time lapse.

Introduction of statistical analysis engines based on the search engine technology in the field of data analytics and business intelligence provides various benefits over typical data warehouse approaches to statistical data analysis and reporting. Some example disadvantages of using data warehouses include, ability to only support pre-configured analysis methods such as using static formats for dashboards, reports and slice-dice and drill down capabilities, long deployment cycle for design and implementation of data warehouses, inflexibility of data warehouses for supporting ad-hoc changes to data because of the fixed schema of databases, regular maintenance hassles associated with databases for optimal performance, and performance and scalability issues in handling high volumes of data.

Known data analysis and business intelligence systems rely on the user to provide SQL queries as input to the systems. Therefore, a user is presumably sufficiently adept with the business intelligence system to configure reports. The known systems also use a data warehouse such that a dynamic restructuring of data cannot be performed without changes to the data warehouse. The data warehouse, as used by these systems, is developed based on cumbersome and time consuming programming to define, manage, change and scale the data warehouse to users' needs. Therefore, a platform for providing statistical analysis, computation and business intelligence reporting is needed to store and access data dynamically Search engine technology provides data indexing from a data source in a de-normalized schema-free way. The search engine technology using indexed data enables ad-hoc data analysis and rapid deployment, because the deployment does not require a specific design. In addition, search engine technology provides flexibility to handle dynamic changes in data, as individual records are stored as columnar key value pairs. Furthermore, scalability and fast access to the data, even for high volumes, can be provided with minimal maintenance. A higher storage level security than databases can be provided because the data can be stored in distributed binary index files. In addition, the data is not query-able by any other methods except through a provided query engine.

Known text or content based search engine technology, however, does not natively render itself for analytics and business intelligence use. Therefore, a need exists for a computational data search engine technology that incorporates statistical analysis, mathematical and logical computation engines, and visual transformation and rendering, to function based on search engine technology to support comprehensive data analysis capabilities. The computational data search engine, can be a search engine technology infused with statistical aggregation and a data analysis engine that operates on search index files and supports fast multi-term lookups in parallel in the field of data analytics and business intelligence, providing various benefits over typical data warehouse approaches to statistical data analysis and reporting. More generally, such a computational engine can be based on, for example, statistical, logical, mathematical, heuristics and/or algorithmic calculations.

Often, data analysis is mainly accessible to users with technical skills or to business intelligence experts because data analysis is based on either writing code or using complex software interfaces to query and visualize data and reports. In some embodiments, a business intelligence platform provides data analysis capabilities to a user irrespective of the user's technology or business intelligence skills by providing a simple natural-language-based question-and-answer system and a computational search-based interface to ask questions or to perform search and data analysis and receive reports. For example, the business intelligence platform can use index files based on computational data search engine technology. Such a platform can provide natural language and search-based interfaces to analyze data and generate reports substantially in real-time without requiring a user to write queries in a query language (e.g., SQL) or use software configurations for generating reports.

In some embodiments, the business intelligence platform can provide data, data analysis, and reports to the user substantially in real-time without having to customize data beforehand. The business intelligence platform also provides a natural language processing engine that translates user questions and queries into appropriate analytics queries and then maps the results using a rule engine to appropriate visualization modules.

As used herein, the singular forms "a," "an" and "the" include plural referents unless the context clearly dictates otherwise. Thus, for example, the term "a "data analysis" is intended to mean a single data analysis or a combination of data analyses (e.g., data analyses associated with a series of applications, services, locations, products, etc.)

FIG. 1 is a schematic block diagram of a communication network system in which real-time business intelligence functions can be provided, according to an embodiment. A communication network system 100 can include one or more user devices or User Equipments (UEs) 101, each equipped with at least a User Interface (UI) 107; one or more search engine servers 109; one or more data source(s) 111; and a business intelligence platform 103. Any of the devices or platforms of the network system 100 can be equipped with local memory/storage spaces (not shown in FIG. 1). Furthermore, the devices and platforms of the network system 100 may have access to centralized or distributed memory/storage spaces (not shown in FIG. 1) through the communication network 105. Thus, FIG. 1 is merely an example illustrating the types of devices and platforms that can be included within a communication network system 100.

Communication network 105 can be any communication network, such as the Internet, configurable to allow the one or more UEs 101, the one or more search engine servers 109, and the business intelligence platform 103 to communicate with communication network 105 and/or to each other through communication network 105. Communication network 105 can be any network or combination of networks capable of transmitting information (e.g., data and/or signals) and can include, for example, a telephone network, an Ethernet network, a fiber-optic network, a wireless network, and/or a cellular network.

In some instances, communication network 105 can include multiple networks operatively coupled to one another by, for example, network bridges, routers, switches and/or gateways. For example, the UEs 101 can be operatively coupled to a cellular network; and the business intelligence platform 103 can be operatively coupled to a fiber-optic network. The cellular network and fiber-optic network can each be operatively coupled to one another via one or more network bridges, routers, switches, and/or gateways such that the cellular network, the Ethernet network and the fiber-optic network are operatively coupled to form a communication network. Alternatively, the cellular network and fiber-optic network can each be operatively coupled to one another via one or more additional networks. For example, the cellular network and the fiber-optic network can each be operatively coupled to the Internet such that the cellular network, the fiber-optic network and the Internet are operatively coupled to form a communication network.

As illustrated in FIG. 1, UEs 101 are operatively coupled to communication network 105 via network connection(s) 113; business intelligence platform 103 is operatively coupled to communication network 105 via network connection(s) 115; search engine servers 109 are operatively coupled to communication network 105 via network connection(s) 117; and data source(s) 111 are operatively coupled to communication network 105 via network connection(s) 119. Network connections 113, 115, 117, and 119 can be any appropriate network connection for operatively coupling UEs 101, business intelligence platform 103, the search engine servers 109, and the data source(s) 111. Furthermore, the business intelligence platform 103 can have a direct connection with search engine server(s) 109 via a communication 123 and the search engine server(s) 109 can have a direct connection to the data source(s) 111 via communication 121.

A network connection can be a wireless network connection such as, for example, a wireless fidelity ("Wi-Fi") or Wireless Local Area Network ("WLAN") connection, a Wireless Wide Area Network ("WWAN") connection, and/or a cellular connection. A network connection can be a wired connection such as, for example, an Ethernet connection, a Digital Subscription Line ("DSL") connection, a broadband coaxial connection, and/or a fiber-optic connection.

As mentioned above, in some instances, a communication network system 100 can include more than one UE 101, more than one search engine server 109, and more than one data source 111. A UE 101, and/or a search engine server 109, can be operatively coupled to the communication network 105 by heterogeneous network connections. For example, a first UE 101 can be operatively coupled to the communication network 105 by a WWAN network connection, another UE 101 can be operatively coupled to the communication network 105 by a DSL network connection, and a search engine server 109 can be operatively coupled to the communication network 105 by a fiber-optic network connection.

The search engine server(s) 109 each can be, for example, a web server configured to provide search capabilities to electronic devices, such as UEs 101. The UE 101 can be in communication with the search engine server(s) 109 via the communication network 105, while the communication is managed by the business intelligence platform 103. For example, the business intelligence platform 103 can send a signal to control the communication between the UE 101 and the search engine server(s) 109.

The UEs 101 can be any of a variety of electronic devices that can be operatively coupled to communication network 105. A UE 101 can be a personal computer, a tablet computer, a personal digital assistant (PDA), a cellular telephone, a portable/mobile internet device, television, kiosk display, display screens in vehicles, projection devices, laser display devices, digital display watches, digital display glasses and/or some other electronic communication device with audio and/or visual capabilities. A UE 101 can also be a television set, a streamer device, a set top box, or any other electronic device equipped with a display unit (a UI 107) and a network connection 113 that enables the device to run applications on an operating system. A UE 101 can be operatively coupled to communication network 105 via the UI 107 and network connection 113. The UEs 101 each can include a web browser configured to access a webpage or website hosted on or accessible via the business intelligence platform 103 over communication network 105. The UEs 101 can be configured to support, for example, Hyper Text Markup Language (HTML) using JavaScript. For example, the UEs 101 can include a web browser, such as, Firefox®, Safari®, Dolphin®, Opera®, Internet Explorer (IE) ®, Chrome® and/or similar browsers. An Internet page or website can be accessed by a user of a web browser at a UE 101 by providing the web browser with a reference such as a uniform resource locator (URL), for example, of a webpage. For example, a user of a UE 101 can access a search engine server 109 via a URL designated for the search engine server 109. In some instances, UEs 101 each can include specialized software other than a browser for accessing a web server such as, for example, a search engine server 109. Specialized software can be, for example, a specialized network-enabled application or program provided by the business intelligence platform 103. In some instances, portions of a website accessible via a web server can be located in a local or remote memory space/data store accessible to the web server.

Data stores 111 can be distributed sources of data throughout the communication network system 100. A data source 111 can be at least one of a database, a data warehouse, a file, etc. A UE 101 can also include a display, monitor or user interface (UI) 107, a keyboard, various ports (e.g., a USB port), and other user interface features, such as, for example, touch screen controls, audio components, and/or video components (each not shown).

Figure 2A:
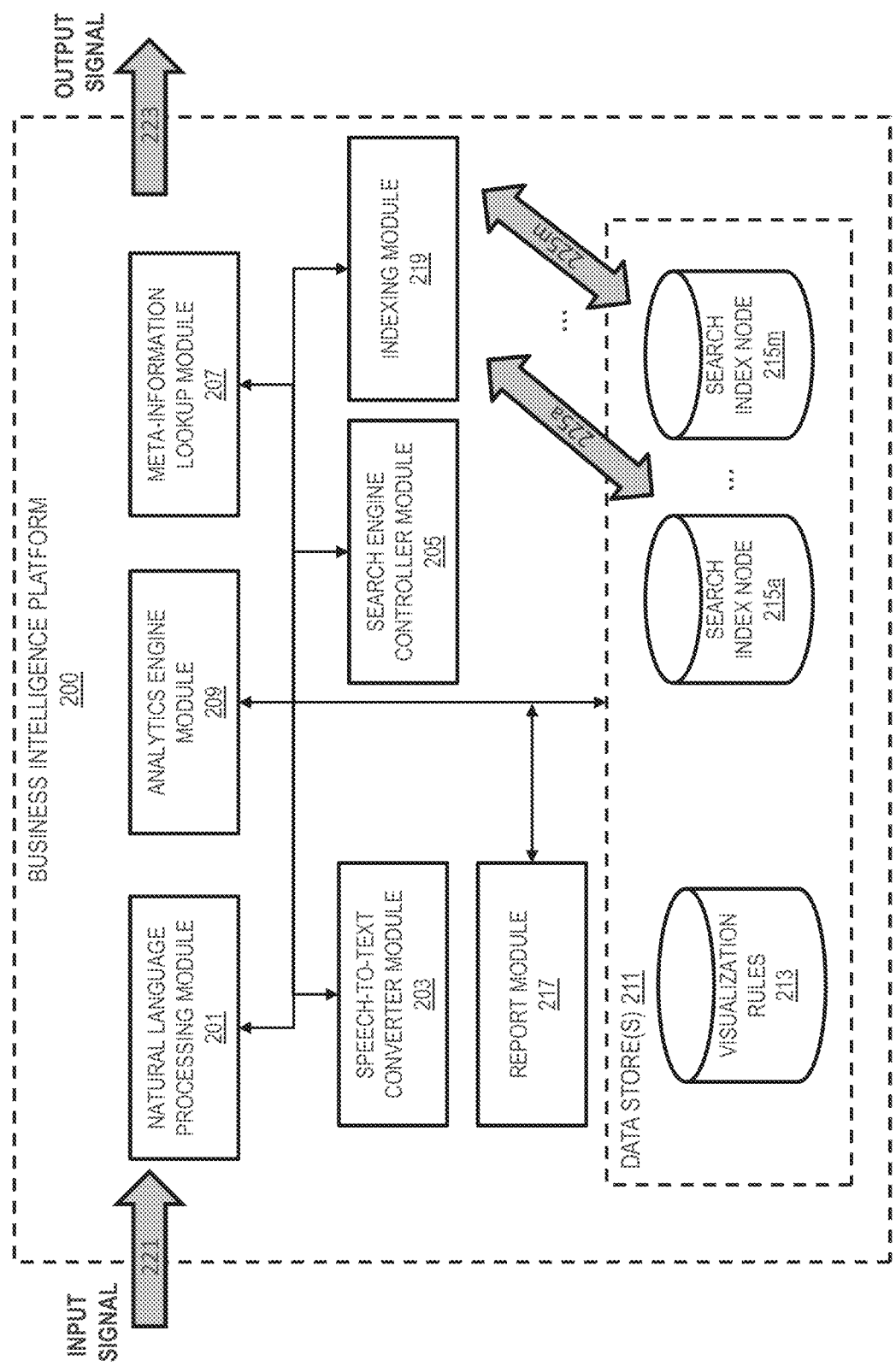
FIG. 2A is a schematic illustration of a real-time business intelligence platform, according to an embodiment.

FIG. 2A is a schematic illustration of a real-time business intelligence platform, according to an embodiment. The business intelligence platform 200 can be similar to the business intelligence platform 103 of FIG. 1. As shown in FIG. 2, a business intelligence platform 200 can include a natural language processing module 201, a speech-to-text converter module 203, a search engine controller module 205, a meta-information lookup module 207, an analytics engine module 209, one or more data store(s) 211, a report module 217, and an indexing module 219. A data store(s) 211 can include visualization rules 213, and one or more search index nodes 215a-215m. Furthermore, the business intelligence platform 200 communicates with other devices of a communication network system (e.g., communication network system 100 of FIG. 1) via input signal 221 and output signal 223.

In various instances, the business intelligence platform 200 and its components can be located anywhere within a communication network system 100 such as that shown in FIG. 1 including, but not limited to, within the UEs 101, or in separate locations within the communication network system 100 of FIG. 1. The business intelligence platform 200 can also be provided as on-premise deployment, via private computation clouds, or be embedded into other software or bundled into devices by Original Equipment Manufacturers (OEMs).

As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

In some embodiments, the business intelligence platform 200 can provide an analytics platform as a Software as a Service (SaaS) such that, for example, the business intelligence services are centrally hosted on the information cloud (not shown) for independent software vendors, system integrators, analytics consultants, enterprises, etc., to build multi-tenant business intelligence and embedded analytics solutions for external and internal customers, for example, by using a browser. The business intelligence platform 200 can enable users to mashup data from various sources for real-time ad-hoc analysis, build reports with rich visualizations and dynamic dashboards, and collaborate in-place among stakeholders to make informed decisions. The business intelligence platform 200 can provide capability of reducing data into smaller parts or views that can yield more information (e.g., slice and dice), drill downs and search on data. For example, a multi-dimensional data structure can be considered as a data cube and the act of picking a rectangular subset of a data cube by choosing a single value for one of its dimensions can define a new data cube with one fewer dimension (e.g., slice operation). Other operations can produce sub-cubes, for example, by allowing an analyst to pick specific values of multiple dimensions (e.g., dice operation). Furthermore, a drill down/up operation allows the user to navigate among levels of data ranging from the most summarized (up) to the most detailed (down).

In some instances, the business intelligence platform 200 receives an input via the input signal 221 representing a question entered by a user of a UE 101. The UE 101, for example, can be equipped with sound input devices and a user can enter a question as a speech input by speaking into a microphone. In such instances, the speech-to-text converter module 203 can convert the speech into text (e.g., as a HTTP request) and send a signal representing the input query to the natural language processing module 201.

In some instances, the speech-to-text converter module 203 can send a signal representing the converted request to the meta-information lookup module 207. The meta-information lookup module 207 can search the data store(s) 211, or a data source(s) 111, for keywords matching the query. The meta-information module 207 can store the keywords in data store(s) 211. The keywords can be used for suggesting search phrase completions to the user of UE 101, for example, when user is typing a question.

In some instances, the natural language processing module 201 receives the query and translates the query into an analytics query (e.g., a query including logical reasoning for finding an answer). For example, if a question in English asks for "all sales", in the business intelligence context, the natural language processing module 201 can translate the question to "total sales". The natural language processing module 201 can send a signal to the analytics engine module 209 representing the analytics query. Furthermore, the natural language processing module 201 can define a presentation type (e.g., line chart, pie chart, etc.) for the query results using the visualization rules 213.

In some instances, the analytics engine module 209 can operate as the primary computational engine which transforms the analytics query into a search query and sends a signal representing the search query to the search engine controller module 205. The search engine controller module 205 can perform a parallel distribution of the search query to one or more search engine server(s) (shown as 109 in FIG. 1), for example via an output signal 223 (shown as 123 in FIG. 1). The search engine(s) 109 performs search on various distributed search index nodes 215a-215m and sends a signal (not shown) representing the search results to the analytics engine module 209.

In some instances, the indexing module 219 collects, parses, and stores search data in search index nodes 215a-

215m via connections 225a-225m to facilitate fast and accurate information retrieval. The indexing module 219 is described in more detail herein with regards to FIG. 3.

In some instances, the analytics engine module 209 can receive data from the search engine controller module 205 and perform real-time computations on the data based on statistical, mathematical, logical heuristic and/or algorithmic functions to generate computed and aggregated results. The results can be further visually transformed based on the visualization rules 213 and presented to the user of UE 101.

In some instances, the user can define rules and/or formulas by which the indexing module 219 or the analytics engine module 209 can calculate derived and/or computed attributes from the original data. The user-defined rules and formulas can be received from a UE 101 via an input signal 221 and stored in data store 211. The attributes computed by the analytics engine module 209 may not be directly present in the original data and derived or computed from other attributes present in the original data using the rules and/or formula defined by the user. The user-defined rules and/or formulas can be applied on the data before the data is indexed by the indexing module 219 or at run-time before presenting the query results to the user via a UE 101. In some instances, the analytics engine module 209 receives the search results and performs statistical computations, aggregations, etc. on the results (e.g., in parallel). The analytics engine module 209 can store the analysis results in data store(s) 211. In another implementation, the storage, processing and user definition of rules/formulas may be performed at the data sources, which may include any of data warehouses, Hadoop, search indices, in-memory or any other data storage format that is used as the source of data analysis.

In some instances, the report module 217 produces reports from the analysis results, for example, by applying the visualization rules 213 to the results. The visualization rules can provide guidelines for reports such as, for example, chart types, colors, formats, etc. The visualization rules 213 can be interactively managed. Thus, the visualization rules can be modified or trained by self learning using machine learning techniques. For example, the visualization rules 213 can be trained such that total sales report is presented as pie chart, while comparative sales report (e.g., among branches of an enterprise) can be presented as bar charts to enable comparison, based on history of users' report selections. The report module 217 can use machine learning techniques to learn (e.g., train visualization rules) based on data, data types, data analysis types, data analysis results, user selection history, etc. In some instances, a user of UE 101 is given the capability to change presentation of data such as, for example, graph type, table formats, etc. In some instances, the reports produced by the report module 217 are stored in data store(s) 211 and are available until changes (e.g., updates, inserts, deletes, etc.) in source data is recognized. In such change instances, the stored reports are erased from the data store(s) 211 and new reports are produced based on the new data.

In some instances, the business intelligence platform 200 can receive user feedback via the UI 107 of UE 101 of FIG. 1 to train and automatically improve various modules such as, for example, the natural language processing module 201, the speech-to-text converter module 203, the meta-information lookup module 207, the analytics engine module 209, or the report module 217. The business intelligence platform 200 can also use the user feedback for improving the visualization rules 213. These improvements enable the business intelligence platform 200 to automatically adapt to different use cases and become more accurate in delivering results for various queries in various use cases, over time. The user feedback can be provided either directly by the user via UE 101 or collected automatically by the business intelligence platform 200, for example, based on the usage patterns of various users.

Figure 2B:
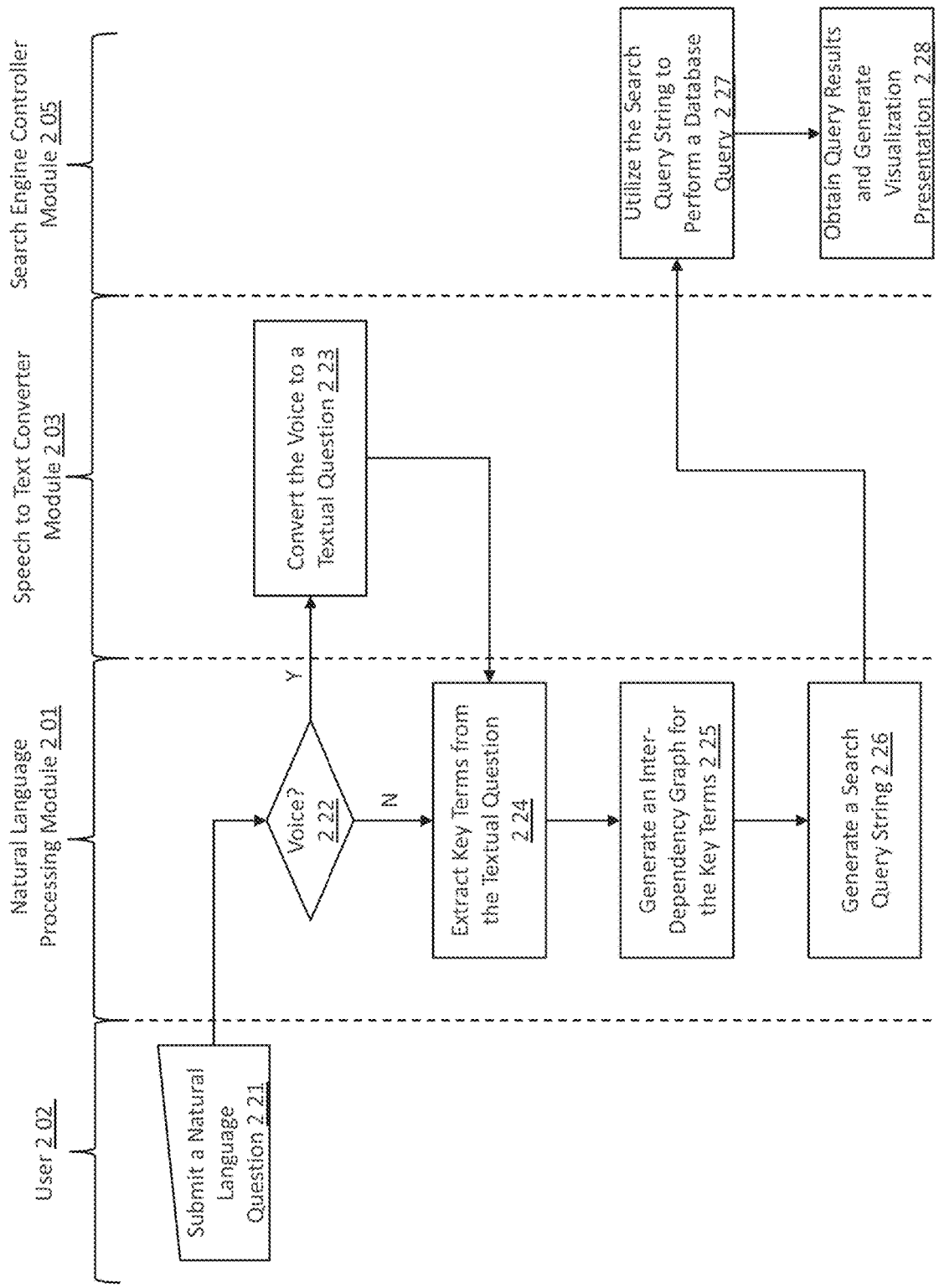
FIGS. 2B-2C are logic flow diagrams illustrating the work flow of processing a natural language question query, according to an embodiment.

FIG. 2B provides a logic flow diagram illustrating aspects of interactive work flows between entities such as the user and/or one or more functional system modules, according to one embodiment. In one embodiment, a user 202 may submit a natural language question for business intelligence analytics via a user interface, e.g., see FIG. 5 as one example. The user 202 may manually type the question into an input field (e.g., 501 in FIG. 5), or may speak to a voice input element (e.g., 505 in FIG. 5). For example, the user may enter a question like "what was my total revenue last year for digital camera in San Francisco store where the margin was more than 100".

The natural language processing module 201 may receive the user submitted question, and determine whether the question is in an audio format at 222. If the question is in an audio format, the voice-input question may be passed on to the speech-to-text converter module 203 to convert the audio question to a text format at 223. The text format of the question is then provided to the natural language processing module 201 for processing at 224.

Otherwise, the natural language processing module 201 may identify and extract entities or key words in the natural language question, at 224. In the above example of a natural language question such as "what was my total revenue last year for digital camera in San Francisco store where the margin was more than 100," extracted key terms may include "total", "revenue", "last", "year", "digital camera", "San Francisco", "store", "margin", "more than", "100" and/or the like.

In one implementation, the natural language processing module 201 may generate an inter-dependency graph (at 225) between the key words to map the key words and the logic relationship thereof to a set of database query variables, so as to generate a search query string or a SQL query or any other query formats as required by the data source, e.g., at 226. The search query string is then provided to the search engine controller module 205, which may in turn use the search query string to perform a search on a data source for the user-desired business data at 227. The query may return results, which can be presented for example with a user-selected visualization format, based on the query semantics and nature of the response data, at 228 (example query result visualization UIs are provided in FIGS. 6-10).

Figure 2C:
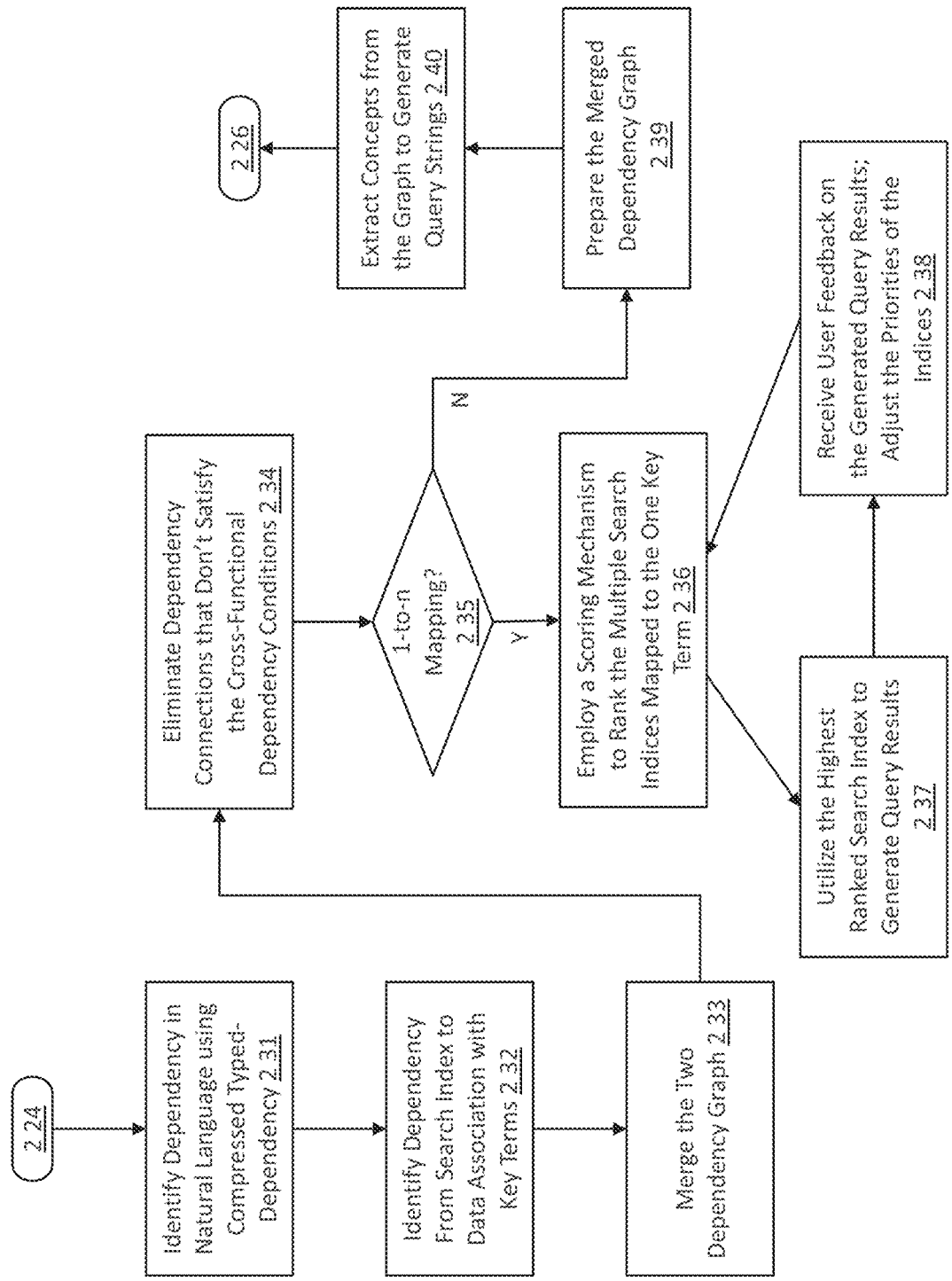

FIG. 2C provides an example logic flow illustrating aspects of generating an inter-dependency graph (at 225), according to one embodiment. In one embodiment, the natural language processing module 201 may employ two parallel parsing processes of identifying the functional dependencies between the key words, respectively, i.e., by generating a language dependency graph and a data dependency graph. The natural language processing module 201 may identify language dependency in the natural language using a compressed typed-dependency based approach, at 231. For example, the sentence structure of the natural language question may be analyzed based on typed-dependency to develop the relationship between the extracted key words.

Figure 2D:
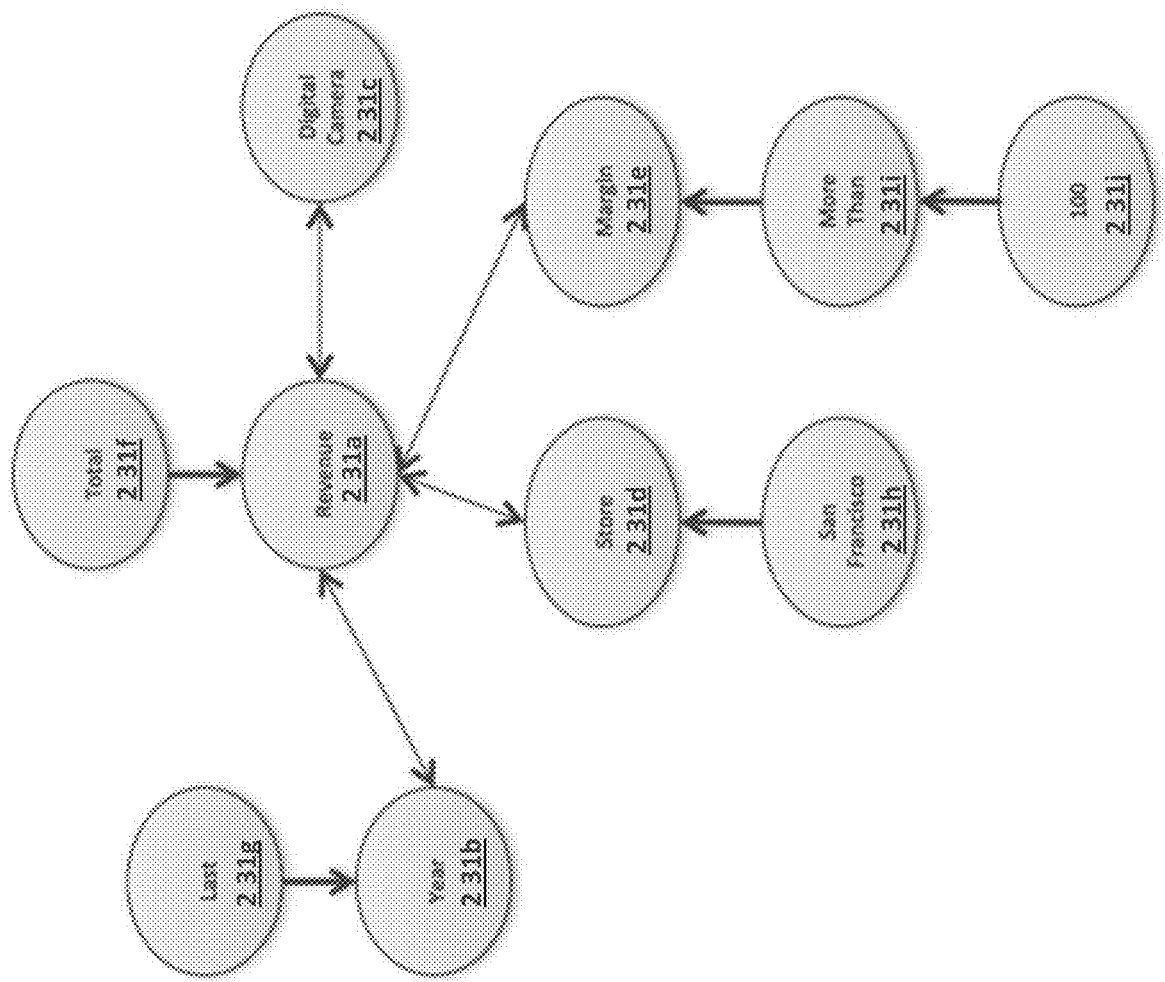
FIGS. 2D-2F are example graphs illustrating a translation of a natural language based question to a search query, according to an embodiment.

An example typed-dependency graph of the natural language question "what was my total revenue last year for digital camera in San Francisco store where the margin was more than 100," is provided in FIG. 2D. The typed-dependency graph has the identified key words as nodes (e.g., 231*a-j*), and inter-related nodes are connected. For example, the key word "Revenue" 231*a*, by the sentence structure of the question, is determined to be related to term "digital camera" 231*c*, "total" 231*f*, "year" 231*b*, "store" 231*d*, "margin" 231*e*. Further, the terms "year" 231*b* is limited by the term "last" 231*g*; "store" 231*d* is limited by the term "San Francisco" 231*h*; "margin" 231*e* is limited by the terms "more than" 231*i* and "100" 231*j*.

Figure 2E:
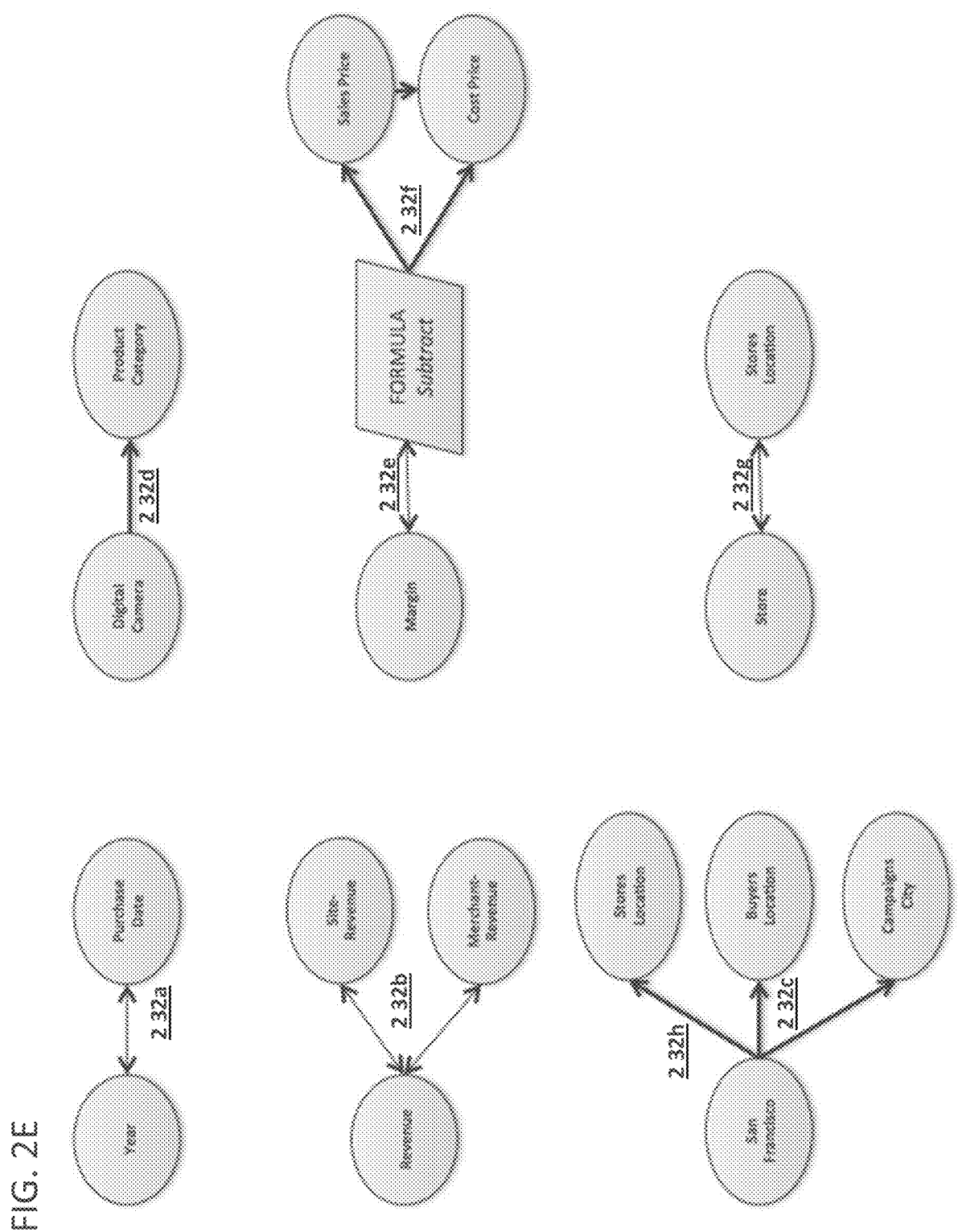
Figure 2F:
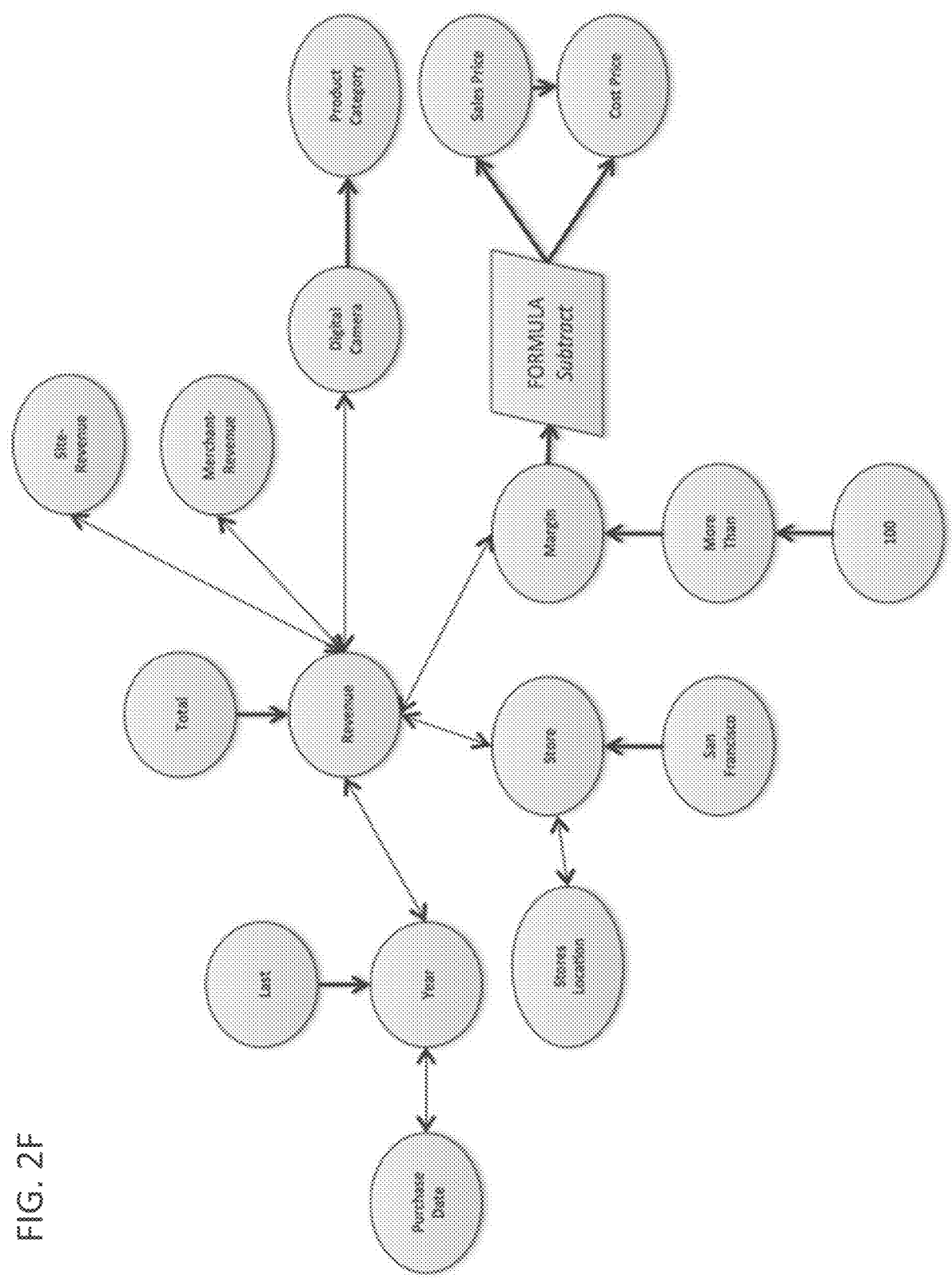

In one implementation, the natural language processing module 201 identifies data dependency from the query terms (e.g., data fields names, data tags, search indices, and/or the like) to find either the data or metadata associations of the key words (e.g., example data associations between search indices and key words are illustrated in FIG. 2E; such data associations may be pre-defined based on text match, user feedback, use cases, and/or the like), e.g., at 232 in FIG. 2C. For example, as shown in FIG. 2E, the dependency graph has the identified key words and search indices as nodes, and the key-term-to-search-index mappings shown as connection between the nodes. In this example shown, the key word "year" may be mapped to the query term "purchase date" at 232*a*; the key word "revenue" may be mapped to query term "site-revenue" or "merchant-revenue" at 232*b*; the key word "San Francisco" may be mapped to query term "store location" 232*h*, or "buyer location" or "campaign city" at 232*c*; the key word "digital camera" may be mapped to query term "product category" at 232*d*; the key word "margin" may be mapped to a formula "subtract" at 232*e*, which may further be linked to search indices "sales price" and "cost price" at 232*f*; and the key word "store" may be mapped to query term "stores location" at 232*g*, and/or the like. It is to be noted that the data dependency graph shown in FIG. 2C may include a search-index-based data store lookup mechanism wherein the query term may include search indices; the dependency graph may be further applied to identify the dependency between key words extracted from a natural-language-based question and query terms in relational databases, NoSQL databases, files, big data storage like Hadoop, in-memory storage and/or other storage layer(s) with a queryable Application Programming Interface (API).

Returning to FIG. 2C, The natural language processing module 201 can then merge the two dependency graphs at 233 and eliminate the scenarios that don't satisfy the cross-functional dependency conditions at 234. In the examples shown at FIG. 2D-2E, the connections between "San Francisco" with "Buyers Location" and "Campaigns City" at 232*c* are eliminated because the first graph, shown in FIG. 2D, shows a "San Francisco" to "Store" connection (231*h* to 231*d*) and "Store" connects to actually "Stores Location" (232*g*); thus the "San Francisco" to "Store Location" connection (232*h*) in the second graph (shown in FIG. 2D) is the one satisfying the cross functional dependency, and will be kept. Thus, the comparison of the two dependency graphs and the elimination process helps obtain accurate matches between the key words and search indices.

In another example, when the natural language processing module determines that there are multiple possibilities for a key word at 235, e.g., "Revenue" yielding both "Site Revenue" and "Merchant Revenue" that are presented as multiple search indices, a scoring mechanism can be used to generate prioritization of the order of the matching search indices, at 236. The scoring mechanism may adopt a wide variety of parameters and factors to rank the search indices for a single key word. One example of the scoring can be based on user feedback, e.g., the search engine controlled module 205 can use the highest ranked query term to generate query results at 237, and can receive user feedback on the generated query results so that the natural language processing module 201 may in turn adjust the priorities of the search indices for the one key word, based on user rating or user views, at 238. A higher user rating may suggest a higher priority of the query term as a match for the key word. Alternatively, the scoring mechanism can employ the number of data points returned from the query using a query term, value of data points of from the query, and/or the like.

In one implementation, an inference mapping may exist between the key words and search indices, e.g., the key word "Year" may be identified as equivalent of "Purchase Date" (e.g., 232*a*), and the key word "Margin" may be identified as a Formula between any attribute that indicates a "Sales Price" and "Cost Price" (e.g., 2320, and/or the like. These connections may be performed via a learning base knowledge bank, which may include keyword and phrase dictionaries, synonym dictionaries, domain specific ontologies, industry KPIs, proprietary knowledge base, any user generated/defined mappings, and/or the like. The knowledge bank can be dynamically generated by for example, doing web search, and progressively updated based on user feedback of an interred mapping. For example, when there is a key word "revenue," then a knowledge graph may be built to map related terms such as "income," "turnover," "gross receipts," "sale amount," and/or the like to the key word "revenue". In this way, when a user searches for any of these terms using the knowledge map, related key words could be identified based on the data inference.

Once the final integrated functional dependent graph is generated at 239, the natural language processing module 201 translates the original natural language question into appropriate queries by extracting the concepts from the graph 240. An example final dependency graph for the example question "what was my total revenue last year for digital camera in San Francisco store where the margin was more than 100" is provided in FIG. 2F. In this example, the natural language processing module 201 translates the question into a search query; such question may also be translated into a different format such as SQL, Map-Reduce, JSON, REST API calls, and/or other format the underlying data source system supports. In one implementation, the generated dependency graphs (e.g., FIGS. 2D-2F) may be stored at a graph database; or alternatively, may be stored in any other form.

Figure 3:
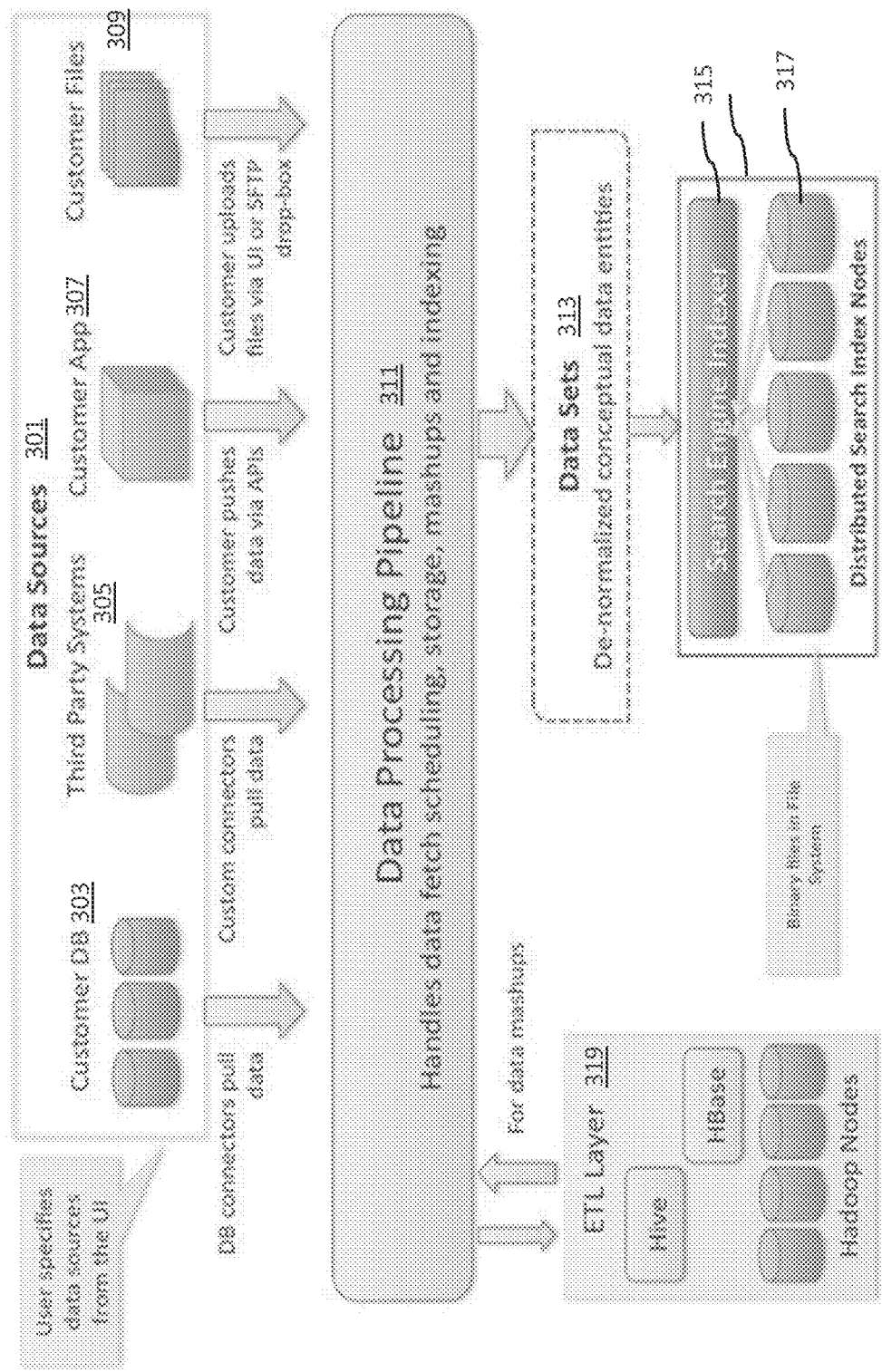
FIG. 3 is a schematic block diagram of a data indexing process pipeline, according to an embodiment.

FIG. 3 is a schematic block diagram of a data indexing process pipeline, according to an embodiment. In some instances, a user of a UE 101 of FIG. 1 selects data to be included in a query from data sources 301. The data sources 301 can be similar to data source(s) 111 of FIG. 1. The data sources 301 can include customer databases 303 (e.g., databases associated with a user or a group of users), third party data systems 305 (e.g., databases or files provided to the user by software providers, data providers, etc.), customer applications 307 (e.g., software applications associated with a user or a group of users such as, for example, financial applications), customer files 309 (files associated with a user or a group of users such as, for example, documents uploaded by the user via the UE 101 or by using file transfer protocols such as, for example, FTP/SFTP, SCP, etc. For example, if a user wants to define a query as "annual sales by city" the user can select data fields representing sales value and city from a sales table in a customer database 303.

In some instances, the indexing module 219 of FIG. 2 executes a data processing pipeline 311. The indexing module 219 can receive the data selected by the user from data sources 301 and process the data through the data processing pipeline 311 by, for example, combining and indexing the data. For example, the data processing pipeline 311 can include one or more database connectors (not shown in FIG. 3) to pull data from the customer databases 303, and one or more custom connectors (not shown in FIG. 3) to pull data from the third party data systems 305). The data processing pipeline 311 can receive data associated with customer applications 307 from a UE 101 via an Application Programming Interface (API) (not shown in FIG. 3). The data processing pipeline 311 can also receive customer files 309 from UE 101 via UI 107 or, for example, via a Secure Shell File Transfer Protocol (SFTP).

Data indexing process, for example, can include defining a data structure that improves the speed of data retrieval operations. For example, indices can be defined using one or more columns of a database table, providing the basis for both rapid random lookups and efficient access of ordered records. In addition, mashup process can be also performed on the data, for example, by the indexing module 219. A mashup process enables the data from various sources to be combined to produce new data sources (or newly searchable data sources) 301. The term mashup includes, for example, easy, fast integration, frequently using open application programming interfaces (API) and data sources to produce results (e.g., answers to queries) that may not be related to the original reason for producing the raw source data. The mashup process by the data processing pipeline 311 can be performed based on processes of Extract, Transform, Load (ETL) layer 319 associated with a database or a data warehouse (not shown in FIG. 3). An ETL process can extract data from various data sources such as relational databases such as, for example, Oracle®, MySQL®, MS SQL Server ®, PostGreSQL®, DB2®, etc.; non-relational databases and NoSQL storages such as, for example, MongoDB®, Cassandra®, CouchDB®, Redis®, HBase®, Hive® etc.; distributed file systems such as, for example, Apache's Hadoop® file systems etc.; other storage systems such as, for example, Netezza®, Terradata®, SAPHana® etc.; third party software or services such as, for example, Salesforce®, NetSuite®, MSDynamics®, MS Dynamics GP®, SugarCRM®, etc. In some instances, the indexing module 219 can store the newly-produced data sets 313 by the data processing pipeline 311 in data store(s) 211. The data sets 313 are de-normalized conceptual data entities extracted from data sources 301 to be used for defining search index nodes 317.

In some instances, a search engine indexer 315 (similar to the search engine control module 205) can use the data sets 313 to define distributed search index nodes 317. The distributed search index nodes 317 can be similar to search index nodes 215a-215m. The search index nodes 317 can include data extracted, transformed, and loaded by the ETL layer 319.

Figure 4A:
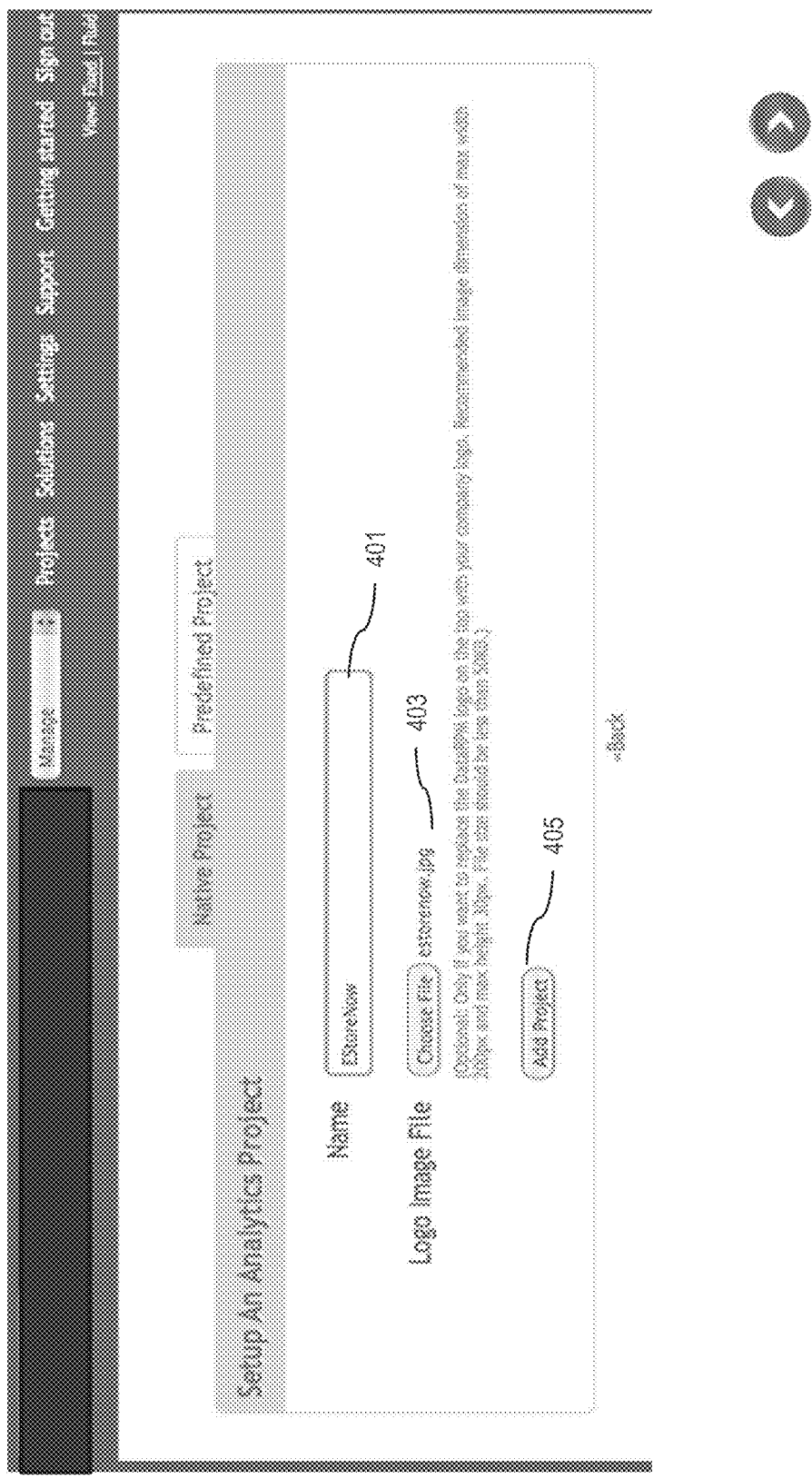
FIGS. 4A-4D are sample display menus for a real-time business intelligence providing system, according to an embodiment.

FIGS. 4A-4D are sample display menus for a real-time business intelligence providing system, according to an embodiment. FIG. 4A is a display menu for adding a new project. In some instances, a project is a dedicated workspace for a user of UE 101. This workspace can be in a local storage of UE 101, in data store(s) 211, or in a computation cloud associated with the business intelligence platform 200. The workspace provides capability of exploring, analyzing data, producing reports and dashboards for a particular user. This is highly secure area which will be accessible with proper permissions.

In some instances, a user can sign into the business intelligence platform 200 using a user ID and a Password. After signing in, the user can define a project by, for example, defining a project name 401, and a logo 403. By clicking the button 405, the new project is defined.

Figure 4B:
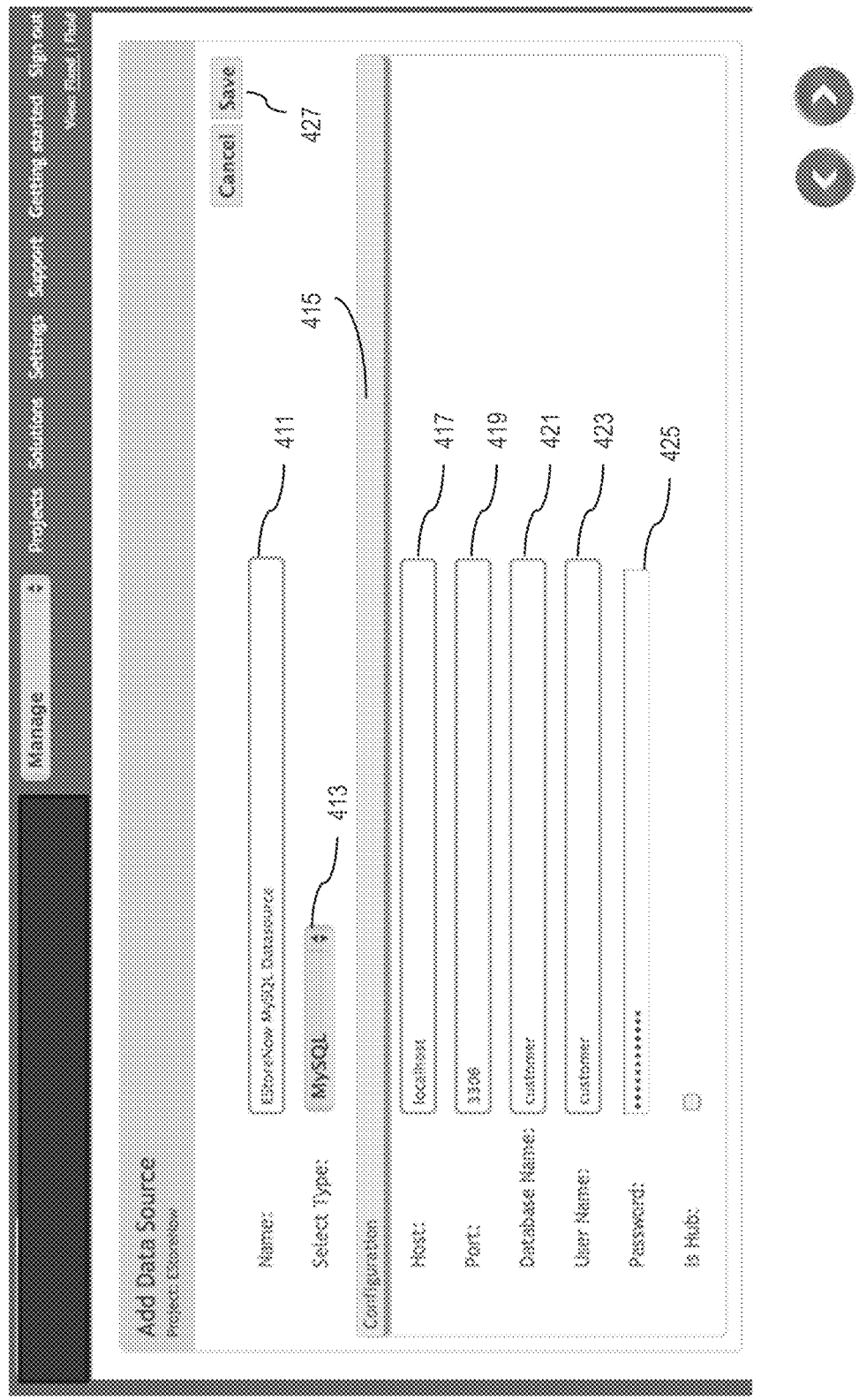

FIG. 4B is a display menus for selecting data sources by a user of UE 101 as described with regards to FIG. 3. In some instances, a user of UE 101 can define a name 411 for a new data source to be added to the data sources 301. The user can then select a type for the data source from a drop down menu 413. Some standard data types can be, for example, MySQL®, Oracle®, MS SQL® Server, etc. The user can also select "file upload" as data types. If "file upload" is selected, a new window is opened to allow the user to upload a file as a data source. The user can also select a configuration of the upload file to show, for example, if the upload file is a document, a spreadsheet, an image, a database table, etc. In addition, the user can define a data set as a data source explained herein with regards to FIG. 4C.

In some instances, a configuration window 415 enables the user to enter his/her credentials for authorizing access to a data source such as, for example, a database. The credentials may include a host name 417, a port 419, a database name 421, a user ID 423 and password 425, etc. The user can then click on button 427 to save the new data source. In some instances, as described with regards to FIG. 3, the user of UE 101 can select data from various data sources (301) and combine them into a new data set (313) (e.g., a table, a spreadsheet, etc.) by the data processing pipeline 311. For example, the user can select a data source (at 421) and enter his/her credentials indicating user's authority to access the data source such as a user name 423 and a password 425. By pressing the save button 427, the indicated data source is saved, for example, in data store(s) 211 and can be used by the business intelligence platform 200 for further analysis.

Figure 4C:

FIG. 4C is a display menu for defining a new data set, according to an embodiment. In the new data set screen of FIG. 4C, the user can select a data source (e.g., a database) from the drop box 431. The user can add columns from multiple data sources accessible to the user to produce a new data set through key relationships among the data sources. For example, if data sources are tables in relational databases, each data table has a primary key that uniquely specifies a tuple within the table. A data field of a table can be a foreign key that matches the primary key of another table. The foreign key can be used to cross-reference the two tables. The user can then select a table or data set (e.g., a datasheet) from the selected data source (at 433). For every table/data set selected at 433, the corresponding set of column headers or field names is displayed in list 435. The user can select fields from the selected table/data set by dragging the fields from table 435 and dropping them in box 437. The user can also add every column using the Select All button 439.

In various instances, the business intelligence platform 200 provides various types of data analysis elements such as, for example, dimensions (441), measures (443) and date/time (445). Dimensions 441 are the context or categories based on which measures 443 are summarized meaningfully such as, for example, "Sales by City", where "City" is a dimension 441. Measures are typically quantifiable (e.g., numeric) such as, for example, Salary, Revenue, Sales, Margin, etc. The date/time element is used to define a time dimension. For example, the user can assign a date column of the data set to the date/time element to define a time trend in data analysis.

In some instances, the business intelligence platform 200 can assign an element to each data column added to the new data set by default by inferring the data type of the data column based on a content of the column. For example, if a sales column (with numeric data values) is added to a data set, the sales column can be defined as a measure element 443 in the data set. As another example, if a name data column (with character string data values) is added to a data set, the name column can be defined as a dimension 441 in the data set. In some instances, the business intelligence platform 200 enables the user to reassign a column to a dimension 441 instead of a measure 443 by dragging and dropping the filed from list 435 into dimension 441 of table 437.

Figure 4D:
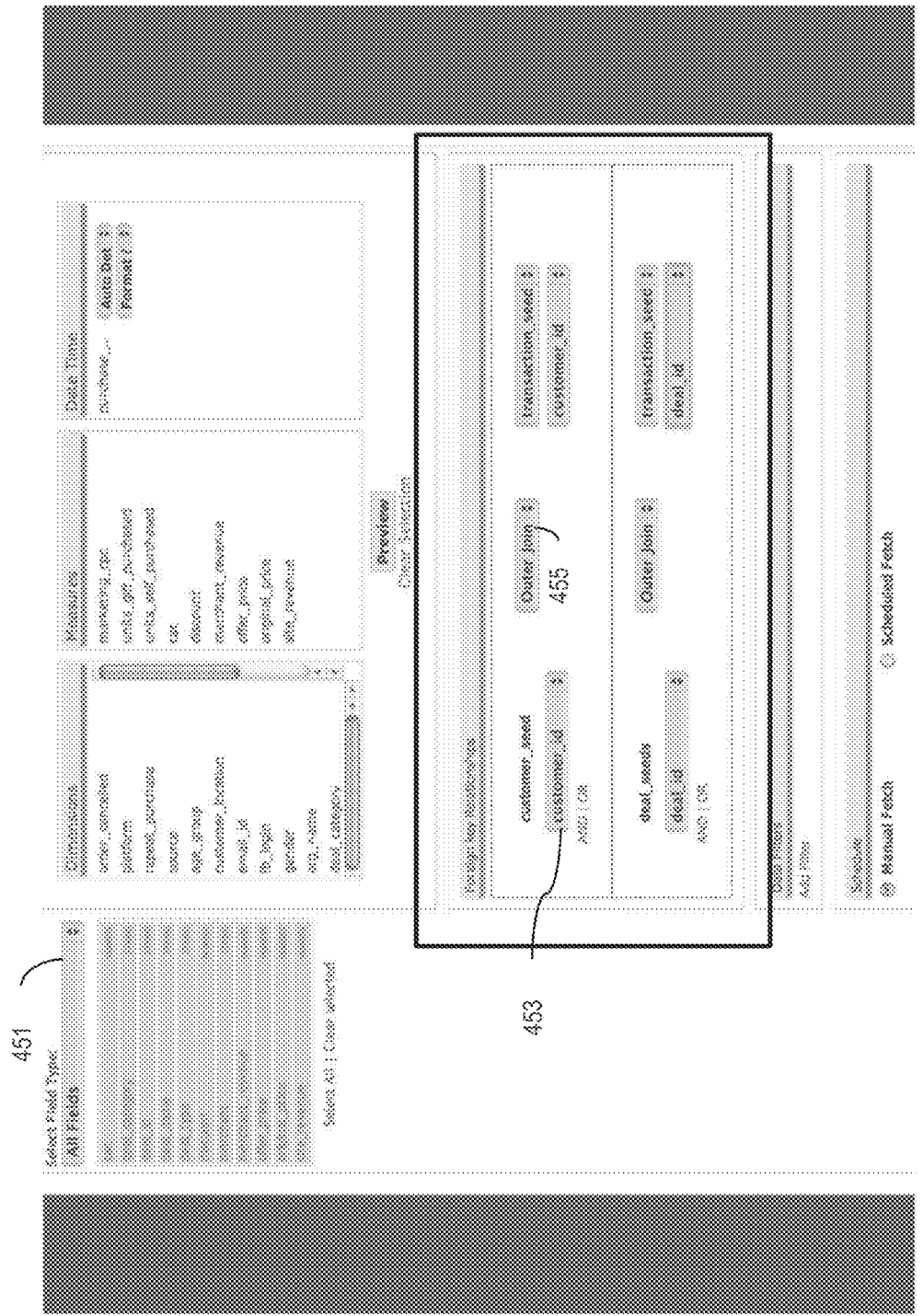

FIG. 4D is a display menu for defining relationships between data sets and/or data elements, according to an embodiment. In some instances, the user is enabled to define key relationships (e.g., primary key, foreign key) across tables/data sets (e.g., if columns of data in the data set exist across tables/data sets) as well as unique keys. Furthermore, if a new data set contains columns of data across tables or data sources, a Primary Key/Foreign Key relationship can be defined. In some instances the ETL Layer 319 can automatically determine the relationships between tables by reading the metadata information or data dictionaries/definitions from the data source or by using heuristics, rules or other algorithms. For example, as seen in FIG. 4D, the user can select key fields from the data fields 451 using the drop box 453; select an operation such as, for example, database operation union (to combine tuples of two data tables and removes all duplicate tuples), database operation join (to connect two data tables over their common data column), etc. from the drop box 455; and apply the operation to selected data fields to define a relationship between the data fields. The user is also enabled to filter columns of the new data set based on a rule (not shown). For example, the user can define a rule by restricting the length of the column value (e.g., 10 digits), or enter a string value such as Sales to filter the added column based on the value. The rules can be combined using "AND"/"OR" clauses.

In some instances, the user is enabled to edit a defined data set (edit display is not shown). The user is also enabled to edit dimensions and measures associated with data fields of a data set (e.g., change a dimension into a measure). In some instances, the user is enabled to define a new measure, or a new dimension, based on a combination of existing measures and/or dimensions using certain formula or rules. The user is also enabled to edit data set rules and/or define new rules. Furthermore, if a new column is added to the data source (based on which a new data set is defined) and the data source has been reloaded (edited) to include the new column, the user can be notified about the new column and the user is enabled to add the new column to the defined data set as a dimension, measure or a date/time element, for example, by updating the new data set, by defining a copy of the new data set including the new column, etc. The user is also enabled to rename a defined data set. In some instances, a data set can be automatically created, for example by the business intelligence platform 200, once the user connects a data source by using metadata associated with the data source, data dictionaries/definitions from the data source, heuristics, rules, one or more predefined algorithms, etc.

In some instances, the user is enabled to specify the frequency at which data is indexed from the data source. The user can choose frequencies such as, for example, one hour, six hours, one day, one week, etc. In some instances the user is enabled to choose precise times such as, for example 12 PM every day, etc. The user can also be enabled to choose the fields that uniquely define a record or a row of data to support data updates. Furthermore, the user can select the fields using which the new records can be fetched incrementally. For example, a date/time field can be selected to identify new records. In some instances the ETL Layer 319 can automatically determine the best frequency using certain predefined rules or by learning from previous data fetch instances using machine learning or heuristics algorithms.

FIGS. 4A-4D are set-up display menus enabling a user to setup a project including selecting data sources, defining data sets, defining relations between data sets, etc. Once a project setup is completed, the business intelligence platform 200 can provide business intelligence to the user in response to user queries.

Figure 5:
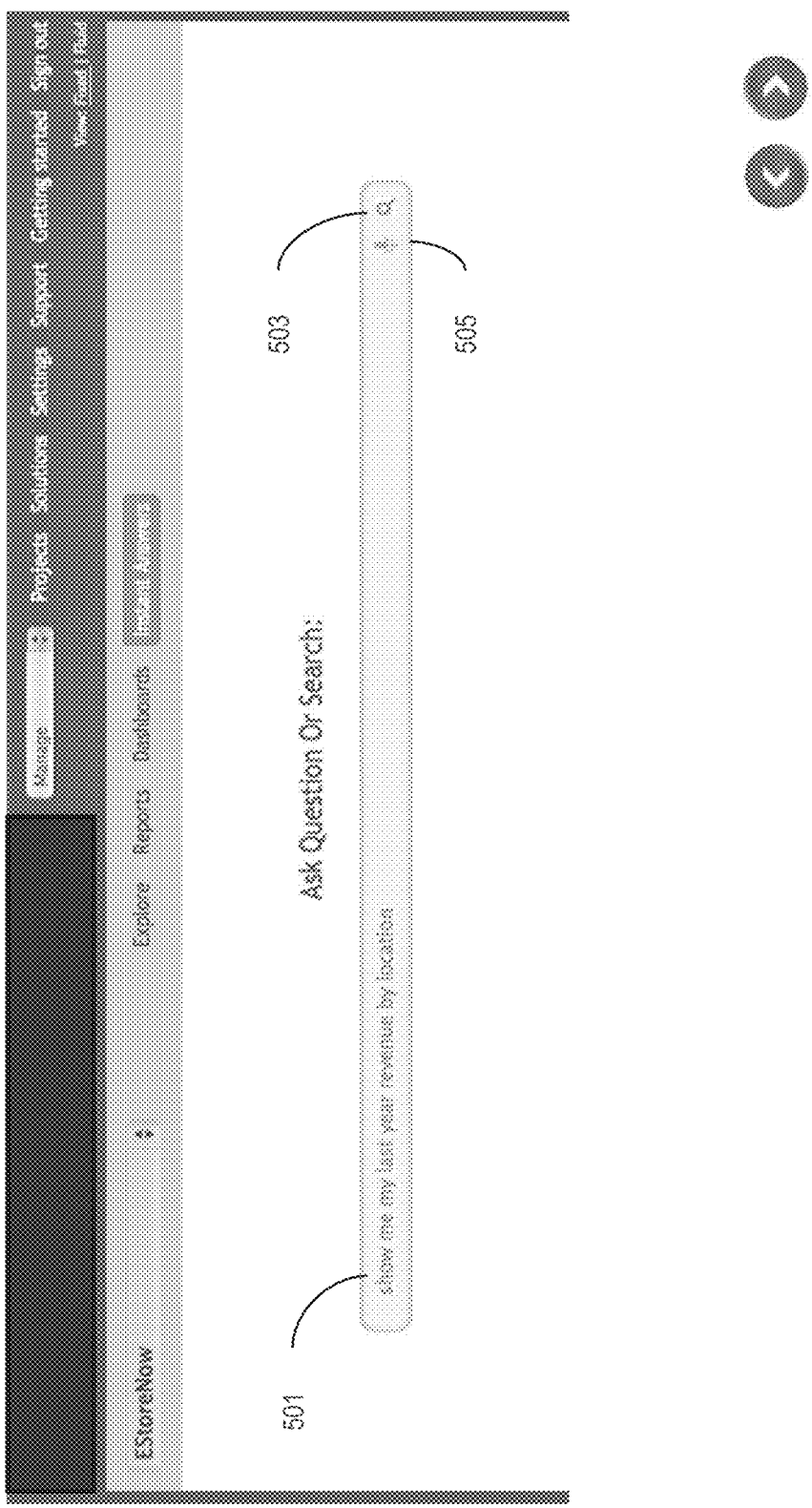
FIG. 5 is a sample display menu for defining queries, according to an embodiment.

FIG. 5 is a sample display menu for defining user queries, according to an embodiment. The user can type a question in window 501 and press the search icon 503. The user can also ask a voice question by speaking into a microphone, by activating the voice input represented by symbol 505.

Figure 6:
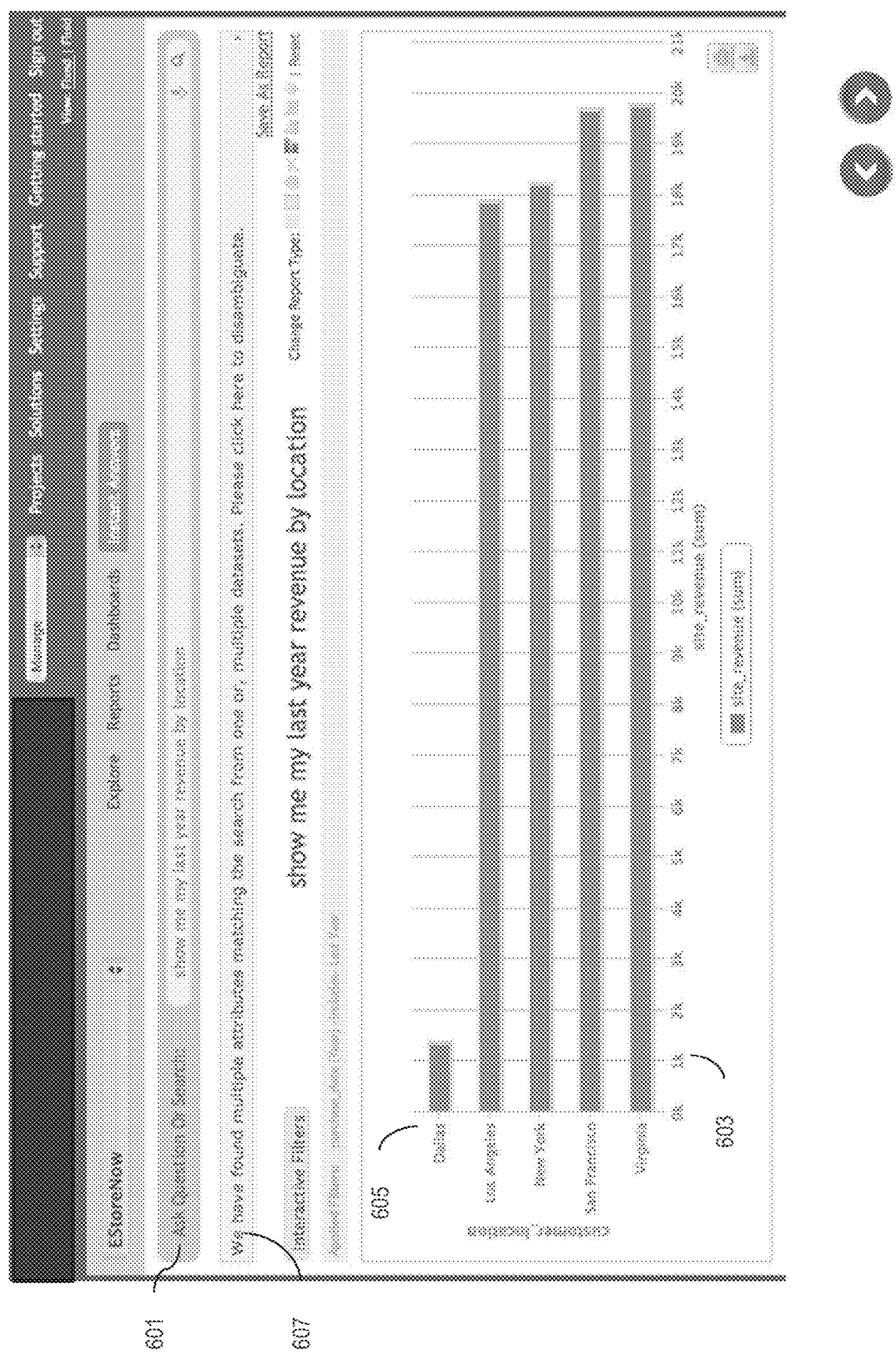
FIG. 6 is a sample report provided by the real-time business intelligence platform, according to an embodiment.

FIG. 6 is a sample report provided by the real-time business intelligence platform, according to an embodiment. The user asked a question 601 "show me my last year revenue by location". The bar chart of FIG. 6 shows the revenue by location by showing revenue values on the horizontal axis 603 and location values on the vertical axis 605. The message 607 indicates that multiple attributes for the search has been found. In some instances, when multiple attributes are found the business intelligence platform 200 can provide an option to the user to allow the user to save the preferences, for example in data store 211. The business intelligence platform 200 can also automatically learn from the user preferences for future searches.

In some instances, if the business intelligence platform 200 fails to find a matching attribute based on the user's question or search query, the business intelligence platform 200 can identify a closest match based on various criteria such as, for example, spell corrections, semantic matching techniques, dictionaries, searching private or public knowledge repositories, third party APIs, rules, heuristics, natural language processing or machine learning algorithms, user preferences, collaborative learning techniques, and/or other techniques to provide relevant suggestions or automatically mapping.

In various instances, the business intelligence platform 200 can define a format of the report (e.g., chart type) based on a default value without user-specified information, or based on a user preference entered by the user during system setup. For example, a default value for a "revenue by location" chart can be set as a bar chart, a line chart, etc. The business intelligence platform 200 can also enable the user to select and update report format while the report is provided. In some instances, the business intelligence platform 200 can learn from user selections and provide subsequent reports based on formats previously selected by the user for similar reports.

Figure 7:
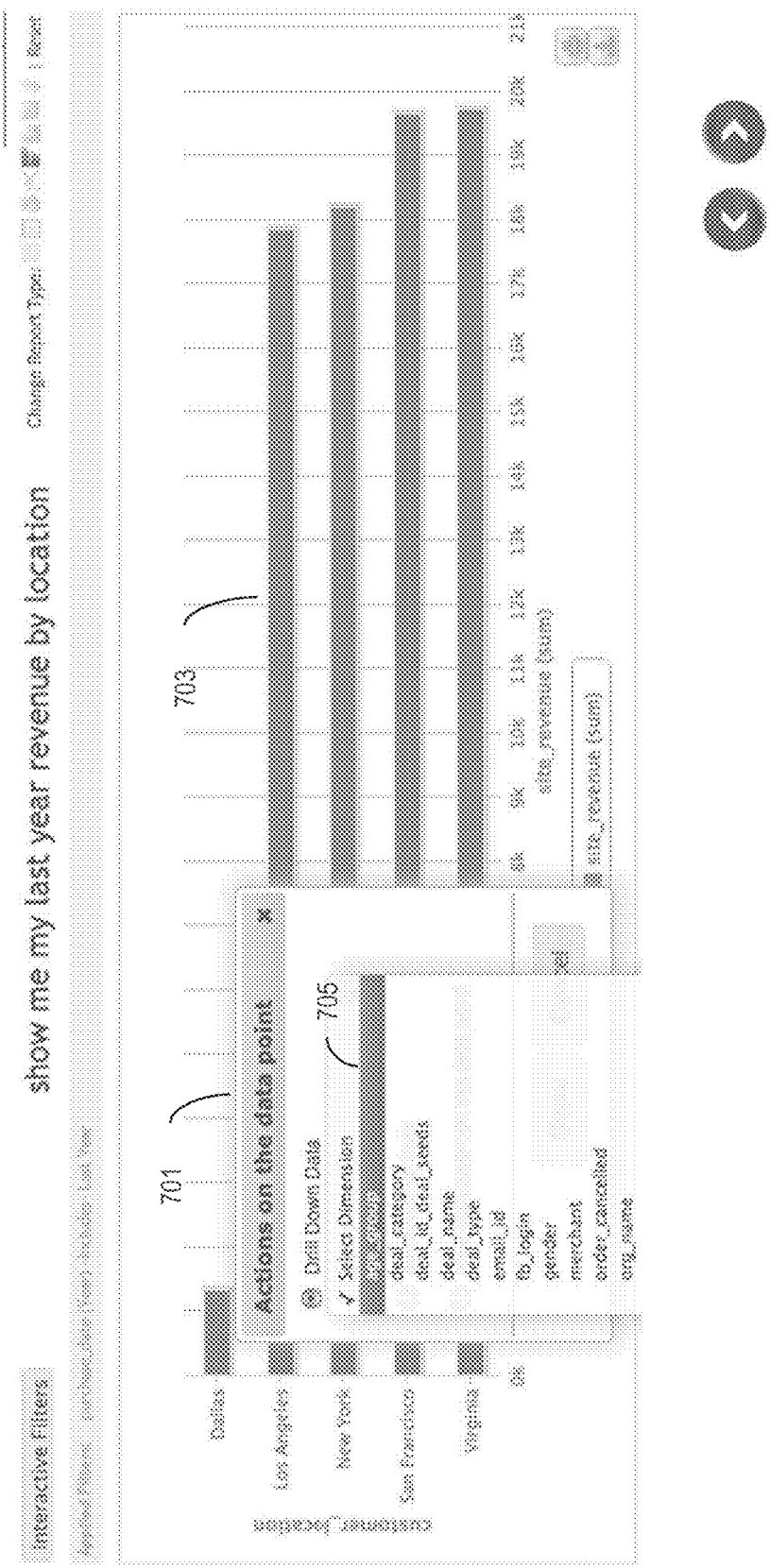
FIG. 7 is a sample display menus for ad-hoc drill down of a real-time business intelligence report, according to an embodiment.

The user can refine the answer by filtering the answer using an ad-hoc drill down as shown in FIG. 7. For example in FIG. 7 the user can select a dimension from a drill down drop box 701 to be used for interactive filtering of the answer based on, for example, an age-group 705, a deal type, a deal name, etc. The dimensions in the drop box 701 can be the dimensions selected by the user during a setup as discussed with regards to FIG. 4C above. In some instances, the user is allowed to filter results, for example, by appending text to the existing question or search query or by providing a follow-up question or search query.

Figure 8:
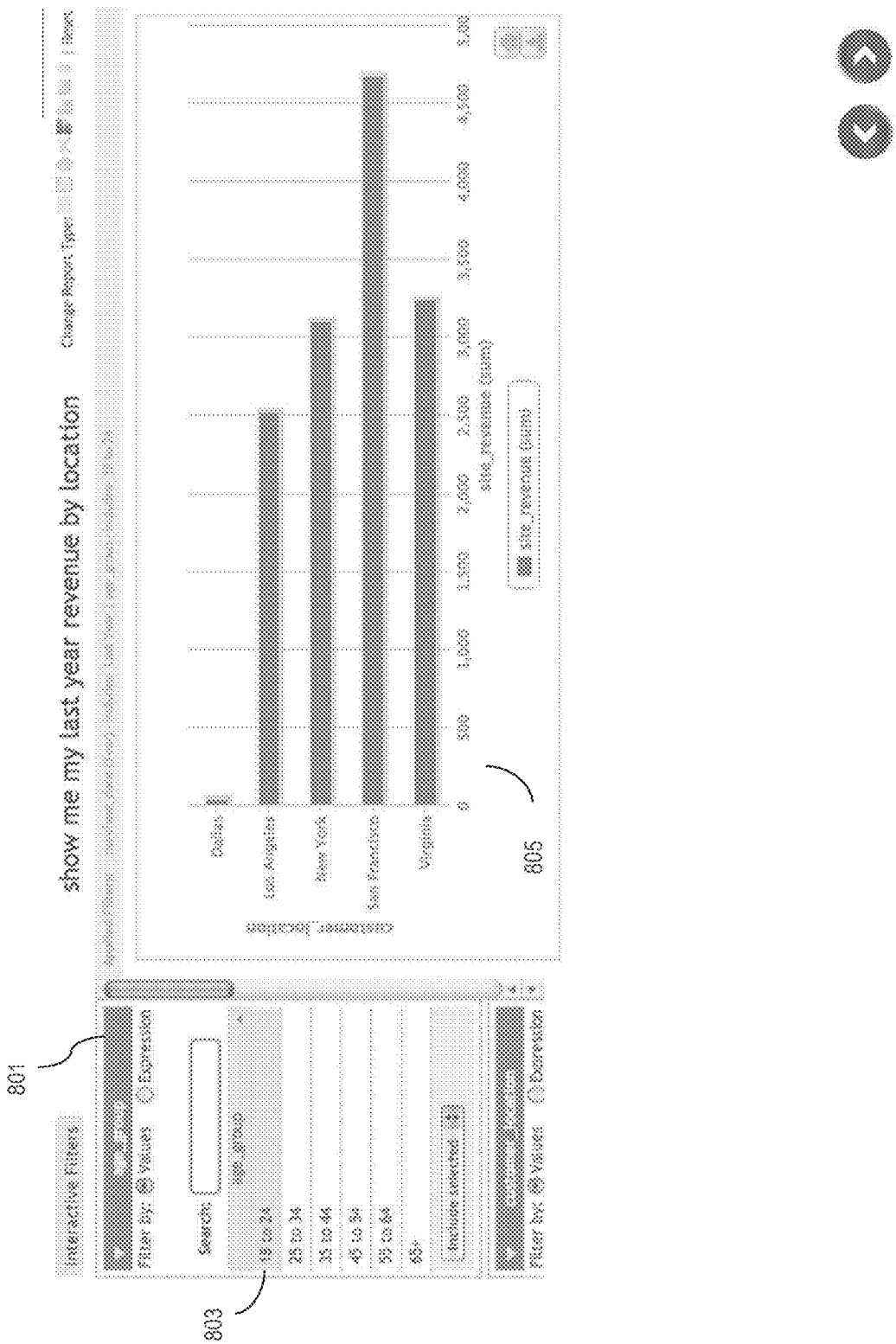
FIG. 8 is a sample display menus for applying interactive filtering on a real-time business intelligence report, according to an embodiment.

FIG. 8 is a sample display menu for applying interactive filtering on a real-time business intelligence report, according to an embodiment. For example, if the user selects the age-group dimension 705 in FIG. 7, in the display of FIG. 8, the age-group table 801 can provide various age selection filters to the user for filtering the query answer 703. The values of age-groups 803 in FIG. 8 can be values of a data field age-group in a data set defined as seen in FIG. 4C. For example, values of the age-group can be "18 to 24", "25 to 34", "35 to 44", etc. and if the user selects the age-group "18 to 24" as an interactive filter (shown as 803), the analytics engine module 209 of the business intelligence platform 200 can update the bar chart 703 and produce the bar chart 805 based on the selected filter, substantially in real-time.

In various instances, the menu for interactive filtering or drill downs can be automatically generated based on the data using certain algorithms or heuristics, or predefined by the user. Furthermore, the results can be saved or bookmarked for future reference or use for example, in the data store 211.

In some instances the business intelligence platform 200 can recommend questions, search queries, reports, dashboards, filters, drill downs, etc., based on the user's prior questions or search queries, the user's interests, or based on trends and what other users are asking on the platform using certain rules or algorithms to calculate affinity or relevance of the recommendations.

Figure 9:
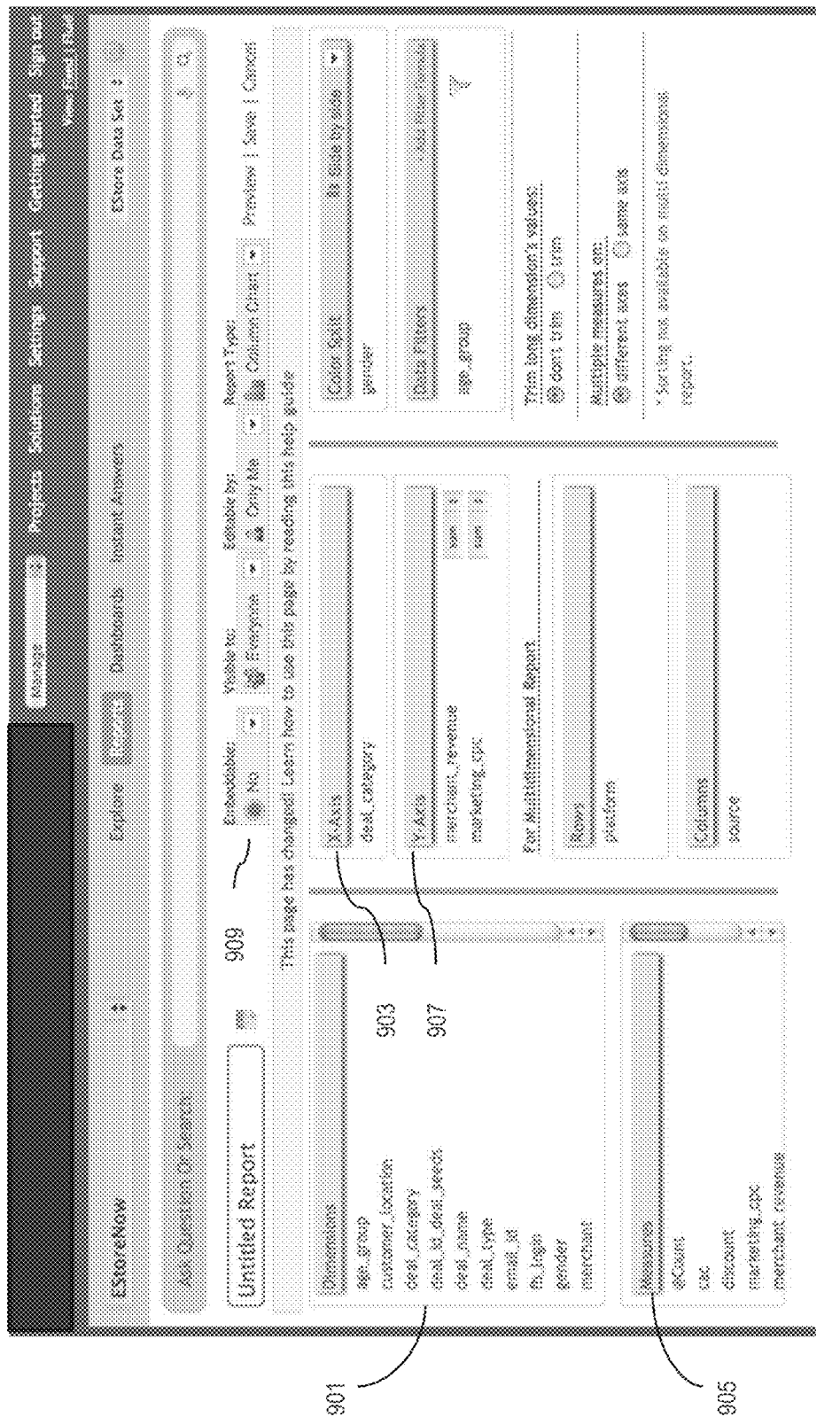
FIG. 9 is a display user interface for manual building of complex reports, according to one embodiment.

FIG. 9 is a display user interface for manual building of complex reports, according to one embodiment. In some instances, the user is enabled to assign one or more dimensions from list 901 to a report axis (e.g., 903). The user is also enabled to assign one or more measures from list 905 to another report axis (e.g., 907). The user can also configure the report by defining embedability, visibility, editability, and type of the report (909).

Figure 10:
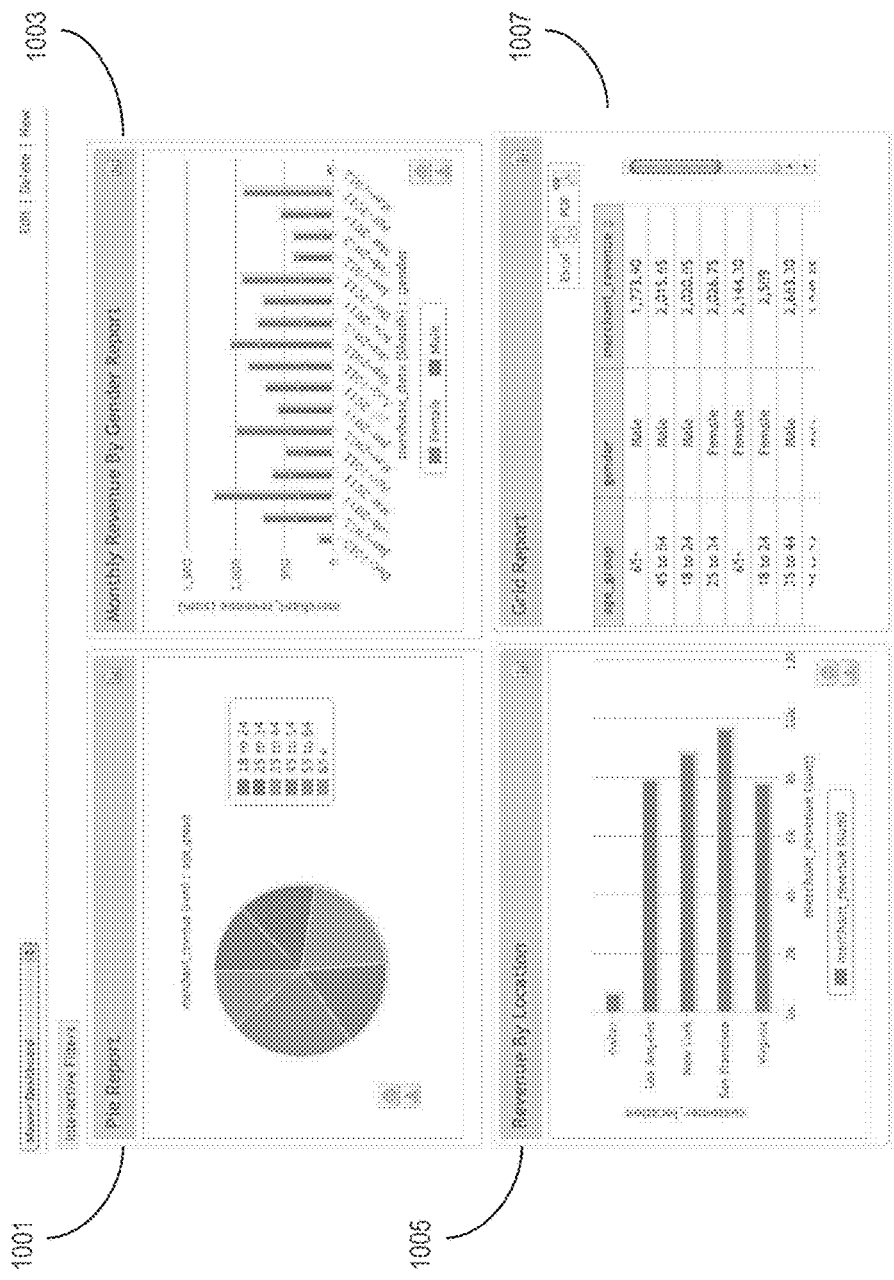
FIG. 10 is a sample display user interface for manual building of dashboards by selecting reports, according to an embodiment.

FIG. 10 is a display user interface for manual building of dashboards by selecting reports, according to an embodiment. For example, a user can select reports to be included in a dashboard from a drop down menu representing a list of available reports. The list of available reports may include default reports, reports previously defined by a user and saved in a storage location (e.g., data store(s) 211), etc. For example, the dashboard of FIG. 10 is built from a pie report 1001, a "monthly revenue by gender" report 1003, a "revenue by location" report 1005, and a grid report 1007.

Figure 11:
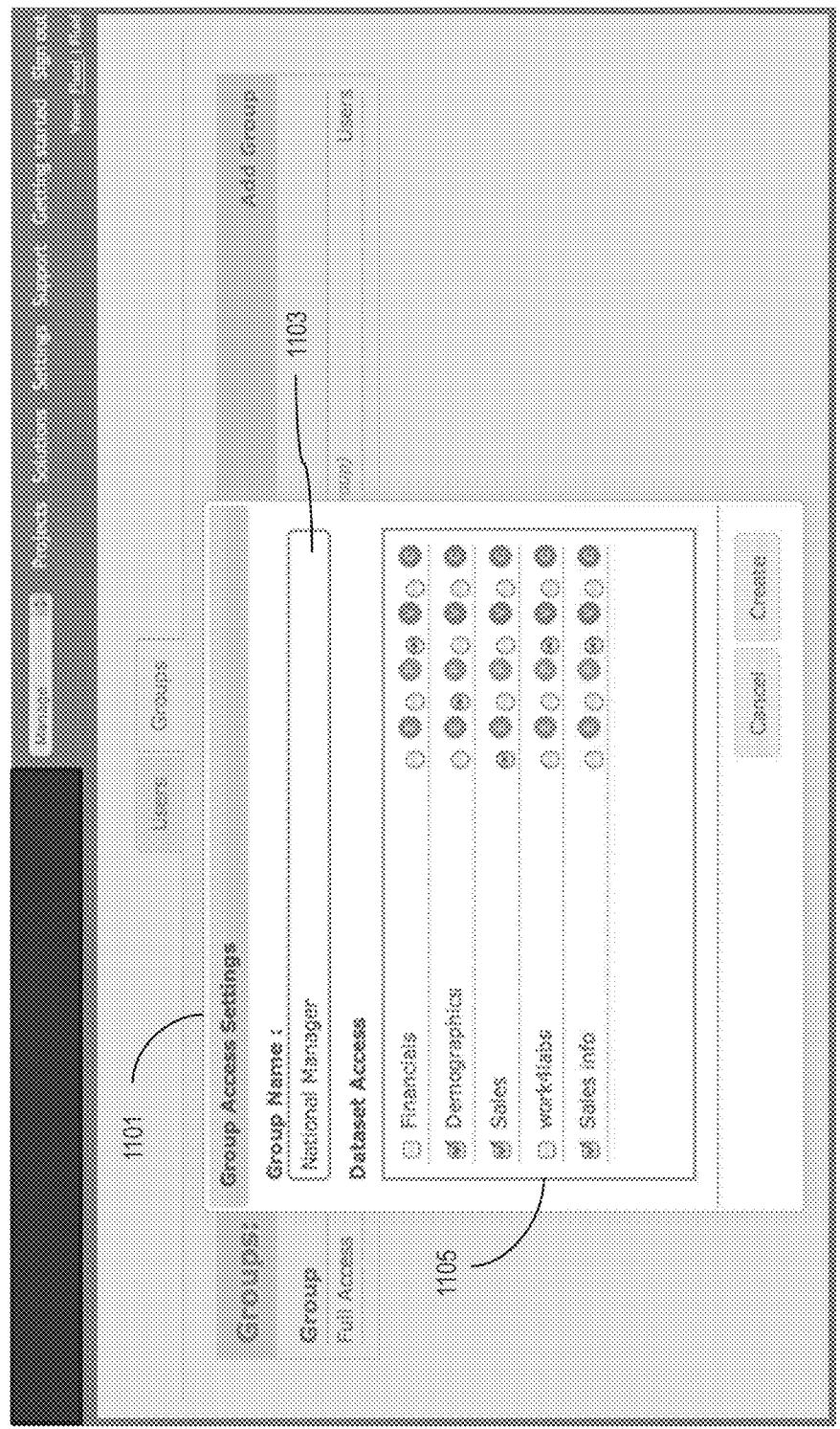
FIG. 11 is a sample display menu for defining role based security groups of users, according to an embodiment.

FIG. 11 is a display menu for defining role-based security groups of users, according to an embodiment. In some instances, an authorized user (e.g., a manager) can use the group access settings 1101 of FIG. 11 to define access rights of various groups of users (1103) for accessing various categories of data sets (e.g., shown in list 1105). In some instances, a user can define categories of data sets and associate data sets with categories at setup time. In other instances, the business intelligence platform 200 can use default categories and associate data sets with categories, for example, based on reports, report types, etc.

Figure 12:
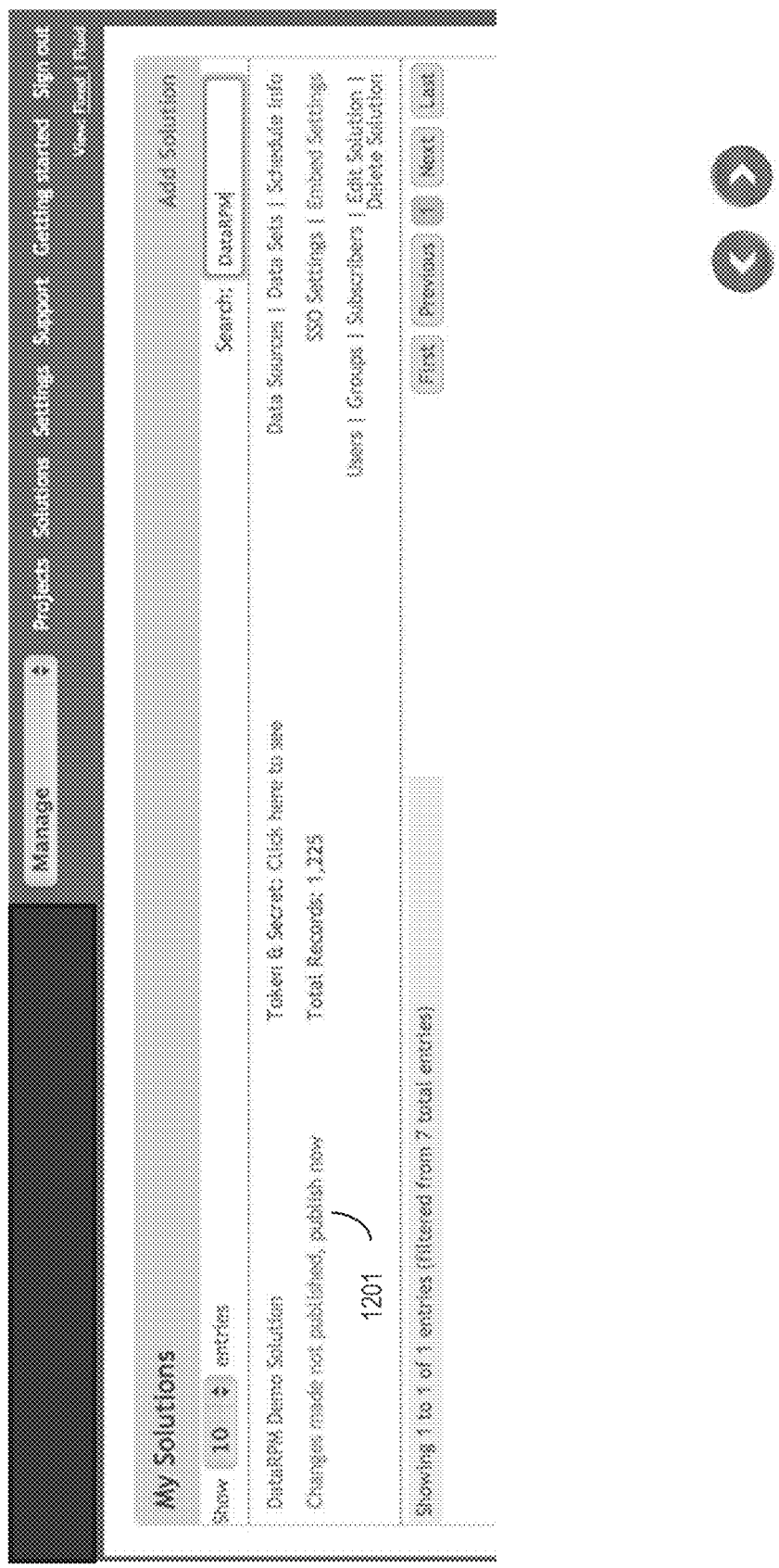
FIG. 12 is a sample display menu for defining multi-tenant solutions, according to an embodiment.

FIG. 12 is a display menu for defining multi-tenant solutions, according to an embodiment. A multi-tenant business intelligence solution can serve multiple customers (tenants), while each customer can be given the ability to customize some parts of the solution such as, for example, color of the user interface (UI), business rules, visualization rules, report formats, etc. For example, a customer can build a business intelligence solution as discussed with regards to FIGS. 4-11 and publish to multiple other customers at click of a publish button (e.g., 1201 in FIG. 12). In one implementation, the multi-tenant business intelligence platform may build a learning process for user behaviors across the various tenant so that the collaborative learning may help improving the accuracy of the natural-language query processing, e.g., user behaviors may be used as user feedback at 238 to improve the natural-language key word to query term mapping.

In some instances, the business intelligence platform 200 enables users to perform real-time collaboration on the data. The user is enabled to start a discussion on a report, a chart within a report, data points within a chart, etc. The user can add other users into the discussion thread. Users with proper access are allowed to view various discussion threads and participate in discussions by leaving comments. The users mentioned in a discussion thread can receive notifications by email, text message, or other digital communication channels.

In some instances, the business intelligence platform 200 enables users to perform advanced data analysis such as, for example, predictive analytics and forecasting by asking a question. For example, a user may ask "Show me the estimated sales for the next 4 quarters". The business intelligence platform 200 can perform predictive analytics, for example, by executing certain pre-built data mining algorithms, to provide responses to questions asked by the users.

In some instances, the business intelligence platform 200 can include a notification module (not shown in FIG. 2). The notification module can monitor the data based on various user-defined or automated rules and notify the user of any interesting patterns, changes, deviations, etc. in the data. Alerts from the notification module can be communicated to the user in various forms either as notifications via the UI 107, feeds, emails, chat messages, text messages, voice messages, and/or other forms of communication.

It is intended that the systems and methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Python, JavaScript, Perl, PHP, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

In some instances, a query such as, for example, "revenue by location" can be provided by a user of UE 101 and sent by the UE 101 to the business intelligence platform 200 of FIG. 2 via an input signal 221. The natural language processing module 201 of the business intelligence platform 200 can process the query and determine keywords, for example, by approximate string matching. For example, keywords "revenue" and "location" can be determined from the above query. The meta-information lookup module 207 can perform a search on metadata (e.g., location), for example, in search index nodes 215*a*-215*m*. The metadata search can identify data sets 313 that include location and revenue data. Subsequently, the search engine controller module 205 can send a signal to initiate a search by the search engine service(s) 109 of FIG. 1 for revenue values in the identified data sets 313. In some instances, prior to the search initiation, the analytics engine module 209 can send a signal to the UE 101 providing identified data sets 313 to the user and allowing the user to select a subset of data sets 313 for search. The search results can be stored in data store(s) 211. Upon completion of the search, the analytics engine module 209 can analyze search results to, for example, summarize the revenue values based on the location and store the analysis results in data store(s) 211. Upon completion of the data analysis, the report module 217 can use the analysis results to define reports associated with the query response based on the visualization rules 213. The reports can be presented on a UI 107 of UE 101 via an output signal 223.

What is claimed is:

1. A system, comprising:
 a processor; and
 a memory operatively coupled to the processor, the memory storing instructions executable by the processor to:
  extract a plurality of key words from a natural-language-based question, the plurality of key words including a first key word;
  generate a data dependency graph based on, and including, relationships between the plurality of key words and a plurality of data field names in a plurality of data sources, wherein the data dependency graph maps the first key word in the natural-language-based question to a first data field name and a second data field name in the plurality of data sources;
  generate a language dependency graph based on, and including, relationships between the plurality of key words of the natural-language-based question-using sentence structure rules;
  generate an inter-dependency graph from the language dependency graph and the data dependency graph by:
   merging the language dependency graph and the data dependency graph;
   determining that a mapping between the first key word in the natural-language-based question and the first data field name in the plurality of data sources does not satisfy a cross-functional dependency between the language dependency graph and the data dependency graph; and
   eliminating the mapping between the first key word in the natural-language-based question and the first data field name in the plurality of data sources from the inter-dependency graph; and
  translate the natural-language-based question into a formatted query string based on the inter-dependency graph.

2. The system of claim 1, wherein the inter-dependency graph includes one or more mappings between the plurality of key words and (1) a set of data field names and (2) a set of operational commands based on the relationships included in the data dependency graph and the relationships included in the language dependency graph, and wherein the formatted query string based on the inter-dependency graph is based on a computational operation mapped to a key word of the natural-language-based question in the inter-dependency graph and a data field name mapped to another key word of the natural-language-based question in the inter-dependency graph.

3. The system of claim 1, wherein the plurality of key words are extracted by parsing the natural-language-based question into phrases and eliminating ancillary phrases based on heuristics.

4. The system of claim 1, wherein the inter-dependency graph is defined based on a context and a sentence structure of the natural-language-based question.

5. The system of claim 1, wherein the instructions are further executable by the processor to:
 compare the data dependency graph and the language dependency graph to eliminate inaccurate mappings.

6. The system of claim 1, wherein the instructions are further executable by the processor to:
 instantiate a scoring mechanism to prioritize different mappings when there are multiple data field names mapped to one key word.

7. The system of claim 1, wherein the data dependency graph and the language dependency graph are generated in parallel.

8. The system of claim 1, wherein the inter-dependency graph is saved in an index file linked to the plurality of data sources.

9. The system of claim 1, wherein the relationships between the plurality of key words of the natural-language-based question are grammatical relationships.

10. The system of claim 1, wherein the instructions are further executable by the processor to:
 send a query based on the formatted query string to a data source from the plurality of data sources;
 obtain a query result from the data source in response to the query; and derive an output value for a user-desired analytics variable based on the query result and a computational operation.

11. A method comprising:

extracting, using one or more processors, a plurality of key words from a natural-language-based question, the plurality of key words including a first key word;

generating, using the one or more processors, a data dependency graph based on, and including, relationships between the plurality of key words and a plurality of data field names in a plurality of data sources, wherein the data dependency graph maps the first key word in the natural-language-based question to a first data field name and a second data field name in the plurality of data sources;

generating, using the one or more processors, a language dependency graph based on, and including, relationships between the plurality of key words of the natural-language-based question using sentence structure rules;

generating, using the one or more processors, an inter-dependency graph from the language dependency graph and the data dependency graph by:

merging, using the one or more processors, the language dependency graph and the data dependency graph;

determining, using the one or more processors, that a mapping between the first key word in the natural-language-based question and the first data field name in the plurality of data sources does not satisfy a cross-functional dependency between the language dependency graph and the data dependency graph; and eliminating, using the one or more processors, the mapping between the first key word in the natural-language-based question and the first data field name in the plurality of data sources from the inter-dependency graph; and translating, using the one or more processors, the natural-language-based question into a formatted query string based on the inter-dependency graph.

12. The method of claim 11, wherein the inter-dependency graph includes one or more mappings between the plurality of key words and (1) a set of data field names and (2) a set of operational commands based on the relationships included in the data dependency graph and the relationships included in the language dependency graph, and wherein the formatted query string based on the inter-dependency graph is based on a computational operation mapped to a key word of the natural-language-based question in the inter-dependency graph and a data field name mapped to another key word of the natural-language-based question in the inter-dependency graph.

13. The method of claim 11, wherein the plurality of key words are extracted by parsing the natural-language-based question into phrases and eliminating ancillary phrases based on heuristics.

14. The method of claim 11, wherein the inter-dependency graph is defined based on a context and a sentence structure of the natural-language-based question.

15. The method of claim 11, wherein merging the data dependency graph and the language dependency graph includes:

comparing the data dependency graph and the language dependency graph to eliminate inaccurate mappings.

16. The method of claim 11, wherein merging the data dependency graph and the language dependency graph includes:

instantiating a scoring mechanism to prioritize different mappings when there are multiple data field names mapped to one key word.

17. The method of claim 16, wherein the scoring mechanism ranks the different mappings based at least in part on user feedback.

18. The method of claim 11, wherein the data dependency graph and the language dependency graph are generated in parallel.

19. The method of claim 11, wherein the inter-dependency graph is saved in an index file linked to the plurality of data sources.

20. The method of claim 11, further including:

send a query based on the formatted query string to a data source from the plurality of data sources;

obtain a query result from the data source in response to the query; and derive an output value for a user-desired data analytics variable based on the query result and a computational operation.

* * * * *